United States Patent
Miyamori et al.

(10) Patent No.: US 10,362,180 B2
(45) Date of Patent: Jul. 23, 2019

(54) DIAGNOSING AN IMAGE FORMING APPARATUS BASED ON SOUND SIGNAL ANALYSIS

(71) Applicant: FUJI XEROX CO., LTD., Tokyo (JP)

(72) Inventors: Shinya Miyamori, Yokohama (JP); Tsutomu Udaka, Yokohama (JP); Fumihiko Ogasawara, Yokohama (JP); Katsuyuki Kouno, Kanagawa (JP); Atsushi Ito, Kanagawa (JP); Tomoyuki Mitsuhashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/209,410

(22) Filed: Jul. 13, 2016

(65) Prior Publication Data
US 2017/0223195 A1 Aug. 3, 2017

(30) Foreign Application Priority Data
Feb. 2, 2016 (JP) .................. 2016-018065

(51) Int. Cl.
*H04N 1/00* (2006.01)
*H04R 29/00* (2006.01)

(52) U.S. Cl.
CPC ..... *H04N 1/00029* (2013.01); *H04N 1/00015* (2013.01); *H04N 1/00039* (2013.01); *H04N 1/00061* (2013.01); *H04N 1/00074* (2013.01); *H04R 29/00* (2013.01); *H04N 2201/0082* (2013.01); *H04N 2201/0096* (2013.01)

(58) Field of Classification Search
CPC ........... H04N 1/00002; H04N 1/00015; H04N 1/00029; H04N 1/00034; H04N 1/00039; H04N 1/00058; H04N 1/00061; H04N 1/00074; H04R 29/00
USPC .......................................................... 702/39
See application file for complete search history.

(56) References Cited

U.S. PATENT DOCUMENTS

| | | | |
|---|---|---|---|
| 5,932,801 A | 8/1999 | Akishita et al. | |
| 7,502,570 B2 | 3/2009 | Nishimura | |
| 9,639,996 B2 * | 5/2017 | Treharne | G07C 5/0808 |
| 2003/0088346 A1 | 5/2003 | Calkins et al. | |

(Continued)

FOREIGN PATENT DOCUMENTS

| | | |
|---|---|---|
| CN | 1842695 A | 10/2006 |
| CN | 104931284 A | 9/2015 |

(Continued)

OTHER PUBLICATIONS

Office Action dated Aug. 11, 2017 by the Australian Patent Office in counterpart Australian Patent Application No. 2016210584.

(Continued)

*Primary Examiner* — Eric A. Rust
(74) *Attorney, Agent, or Firm* — Sughrue Mion, PLLC

(57) ABSTRACT

A diagnostic apparatus includes a first acquiring unit that acquires sound information, a second acquiring unit that acquires operation information indicating a component in operation among a plurality of components of an analysis target apparatus, and a display unit that, when the acquired sound information is reproduced, displays operating states of the plurality of components at the time point when the reproduced sound is acquired, using the operation information.

10 Claims, 25 Drawing Sheets

(56) References Cited

U.S. PATENT DOCUMENTS

| | | |
|---|---|---|
| 2004/0136539 A1 | 7/2004 | Uhi et al. |
| 2007/0032968 A1 | 2/2007 | Nakamura |
| 2007/0070456 A1 | 3/2007 | Nishimura |
| 2013/0166051 A1 | 6/2013 | Eaton |

FOREIGN PATENT DOCUMENTS

| | | |
|---|---|---|
| CN | 105222282 A | 1/2016 |
| JP | 2007-079263 A | 3/2007 |
| JP | 2008-290288 A | 12/2008 |

OTHER PUBLICATIONS

Communication dated Aug. 27, 2018, from the State Intellectual Property Office of People's Republic of China in counterpart Application No. 201610649778.4.

\* cited by examiner

FIG. 6

| | WAVEFORM DATA OF FREQUENCY ANALYSIS RESULT | SOUND DATA OF ABNORMAL SOUND | CAUSE OF ABNORMAL SOUND | HANDLING METHOD |
|---|---|---|---|---|
| MODEL NAME: ABC001 | | | | |
| | WAVEFORM DATA 1 | SOUND DATA 1 | ABRASION OF PHOTOCONDUCTOR DRUM | EXCHANGE OF PHOTO-CONDUCTOR DRUM |
| | WAVEFORM DATA 2 | SOUND DATA 2 | GREASE SHORTAGE OF SHEET TRANSPORT APPARATUS | APPLY GREASE |
| | ..... | ..... | ..... | ..... |
| | WAVEFORM DATA 30 | SOUND DATA 30 | DEFECT OF DRIVE MOTOR | EXCHANGE OF DRIVE MOTOR |

MODEL NAME: ABC002

MODEL NAME: ABC003

FIG. 21

EXAMPLE OF SOUND PATTERN OF
OPERATION TIMING SOUND

| OPERATION START PORTION | SOUND PATTERN |
|---|---|
| TRANSFER BELT | TWO TIMES AT SMALL VOLUME |
| PHOTOCONDUCTOR DRUM | THREE TIMES AT LARGE VOLUME |
| FIXING MACHINE | ONE TIME AT LARGE VOLUME |
| DEVELOPING DEVICE | LARGE VOLUEM, SMALL VOLUME, LARGE VOLUME |

*FIG. 23*

EXAMPLE OF FREQUENCY PATTERN OF
OPERATION TIMING SOUND

| OPERATION START PORTION | FREQUENCY PATTERN |
|---|---|
| TRANSFER BELT | 4kHz, 6kHz, 8kHz, 10kHz |
| PHOTOCONDUCTOR DRUM | 4kHz, 8kHz, 10kHz |
| FIXING MACHINE | 4kHz, 6kHz, 8kHz |
| DEVELOPING DEVICE | 4kHz, 10kHz |

DIAGNOSING AN IMAGE FORMING APPARATUS BASED ON SOUND SIGNAL ANALYSIS

CROSS-REFERENCE TO RELATED APPLICATIONS

This application is based on and claims priority under 35 USC 119 from Japanese Patent Application No. 2016-018065 filed Feb. 2, 2016.

BACKGROUND

The present invention relates to a diagnostic apparatus, an image forming apparatus, a diagnostic system, computer readable medium, a diagnostic method, and computer data signal.

SUMMARY

According to an aspect of the invention, there is provided a diagnostic apparatus, including:
a first acquiring unit that acquires sound information;
a second acquiring unit that acquires operation information indicating a component in operation among a plurality of components of an analysis target apparatus; and
a display unit that, when the acquired sound information is reproduced, displays operating states of the plurality of components at the time point when the reproduced sound is acquired, using the operation information.

BRIEF DESCRIPTION OF THE DRAWINGS

Exemplary embodiments of the present invention will be described in detail based on the following figures, wherein:

FIG. 6 is a diagram illustrating an example of information stored in a waveform data storing unit 53 in FIG. 5;

FIG. 21 is a diagram illustrating an example of a sound pattern of the operation timing sound;

FIG. 23 is a diagram illustrating an example of a frequency pattern of the operation timing sound;

DETAILED DESCRIPTION

Hereinafter, exemplary embodiments of the invention will be described in detail with reference to the drawings.

First Exemplary Embodiment

Figure 1:
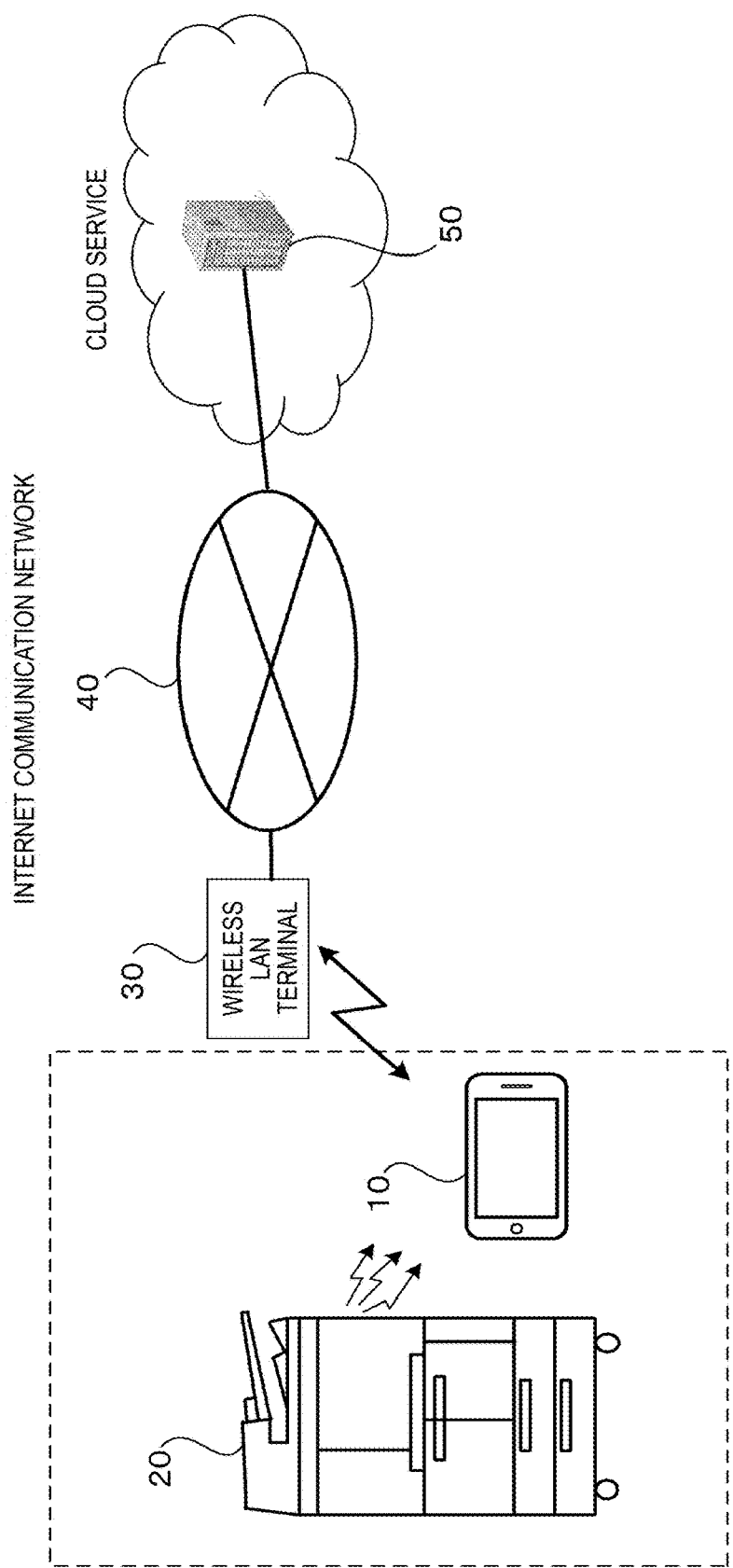
FIG. 1 is a diagram illustrating a configuration of an abnormal sound diagnosis system of a first exemplary embodiment of the invention.

FIG. 1 is a diagram illustrating a configuration of an abnormal sound diagnosis system of a first exemplary embodiment of the invention.

The abnormal sound diagnosis system according to this exemplary embodiment includes a portable abnormal sound diagnosis apparatus 10 such as a personal computer, a smart phone, or a tablet terminal apparatus, and a server apparatus 50 as illustrated in FIG. 1.

Any abnormal sound diagnosis apparatus is applicable to the invention, as long as the abnormal sound diagnosis apparatus 10 can be connected to the server apparatus 50 through a communication network. However, the description in this exemplary embodiment will be made using a case where the abnormal sound diagnosis apparatus 10 is a tablet terminal apparatus which is provided with a device such as a microphone to acquire a sound signal and a touch panel to receive a touch input.

The abnormal sound diagnosis apparatus 10 is carried by a service engineer (maintenance personnel) who maintains or repairs an image forming apparatus 20 such as a printer used by an end user. The abnormal sound diagnosis apparatus 10 is used to acquire an abnormal sound (extraordinary sound) signal generated in the image forming apparatus 20 for a frequency analysis on the acquired abnormal sound signal, or to display a waveform obtained as a result of the frequency analysis on the abnormal sound signal acquired from the server apparatus 50 in the past together with the waveform obtained as a result of the frequency analysis on the acquired abnormal sound signal.

The abnormal sound diagnosis apparatus 10 and the server apparatus 50 are connected to each other through a wireless LAN terminal 30 such as a Wi-Fi router or an Internet communication network 40, and transmit and receive information. In addition, the abnormal sound diagnosis apparatus 10 is configured to be connectable to the image forming apparatus 20 through a wireless line such as Wi-Fi, and can perform transmitting/receiving of the information by wireless.

Further, in a case where the abnormal sound diagnosis apparatus 10 is a portable telephone apparatus or a smart phone, the abnormal sound diagnosis apparatus 10 may be connected to the server apparatus 50 through a portable telephone network, or may perform transmitting/receiving of the waveform data obtained as a result of the frequency analysis.

In the abnormal sound diagnosis system of this exemplary embodiment, in a case where an abnormal sound is generated in the image forming apparatus 20 which is a target electronic apparatus installed in a place of the end user, the service engineer goes to that place of the image forming apparatus 20 with the abnormal sound diagnosis apparatus 10. The service engineer records the generated abnormal sound using the abnormal sound diagnosis apparatus 10 to acquire the abnormal sound signal, and make a diagnosis on the abnormal sound to specify a cause thereof.

Further, it is also technically possible to provide a microphone in the image forming apparatus 20 to have a sound recording function so as to record the abnormal sound when the abnormal sound is generated. However, in a case where the image forming apparatus 20 is installed in an office of the end user, it may be not realized to provide the sound recoding function in the image forming apparatus 20 due to a security problem.

Figure 2:
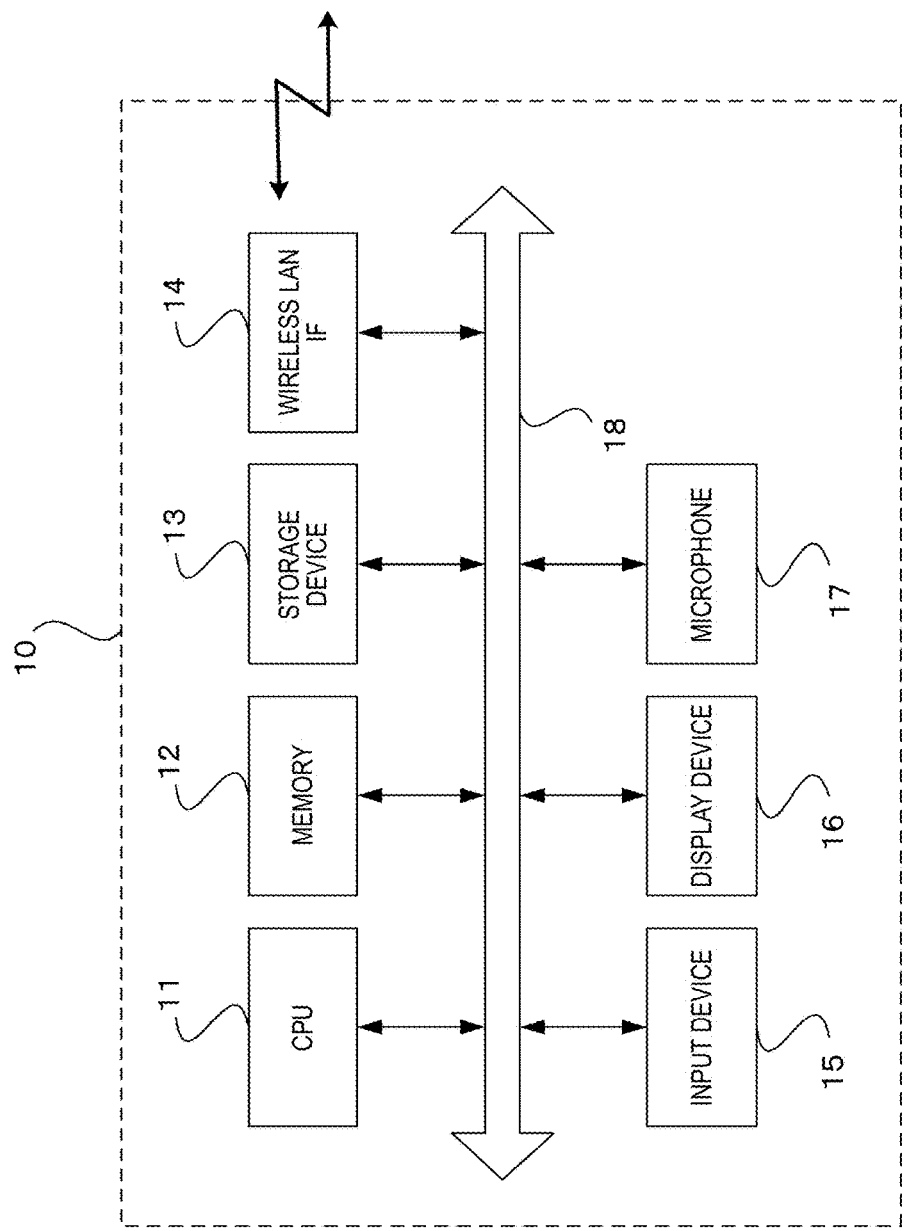
FIG. 2 is a block diagram illustrating a hardware configuration of an abnormal sound diagnosis apparatus 10 in the first exemplary embodiment of the invention.

Next, a hardware configuration of the abnormal sound diagnosis apparatus 10 in the abnormal sound diagnosis system of this exemplary embodiment is illustrated in FIG. 2.

As illustrated in FIG. 2, the abnormal sound diagnosis apparatus 10 includes a CPU 11, a memory 12 capable of temporarily storing data, a storage device 13 such as a flash memory, a wireless LAN interface (IF) 14 that performs wireless communication with the wireless LAN terminal 30 or the image forming apparatus 20 to transmit and receive data, an input device 15 such as a touch sensor, a display device 16, and a microphone 17. These components are interconnected through a control bus 18.

The abnormal sound diagnosis apparatus 10 according to this exemplary embodiment is provided with a touch panel in which a touch sensor for detecting a touch position on the display device 16 is provided as the input device 15, so that the touch panel is used for the display and for the reception of input from the user.

The CPU 11 controls the operation of the abnormal sound diagnosis apparatus 10 by executing a predetermined process based on a control program stored in the memory 12 or the storage device 13. Further, the control program can be downloaded through the Internet communication network 40 or a portable telephone network and provided to the CPU 11. Alternatively, the program can be stored in a storage medium such as a CD-ROM and provided to the CPU 11.

The abnormal sound diagnosis apparatus 10 of this exemplary embodiment executes the above control program to perform the operations to be described below so as to assist the service engineer to specify a cause of the abnormal sound.

Figure 3:
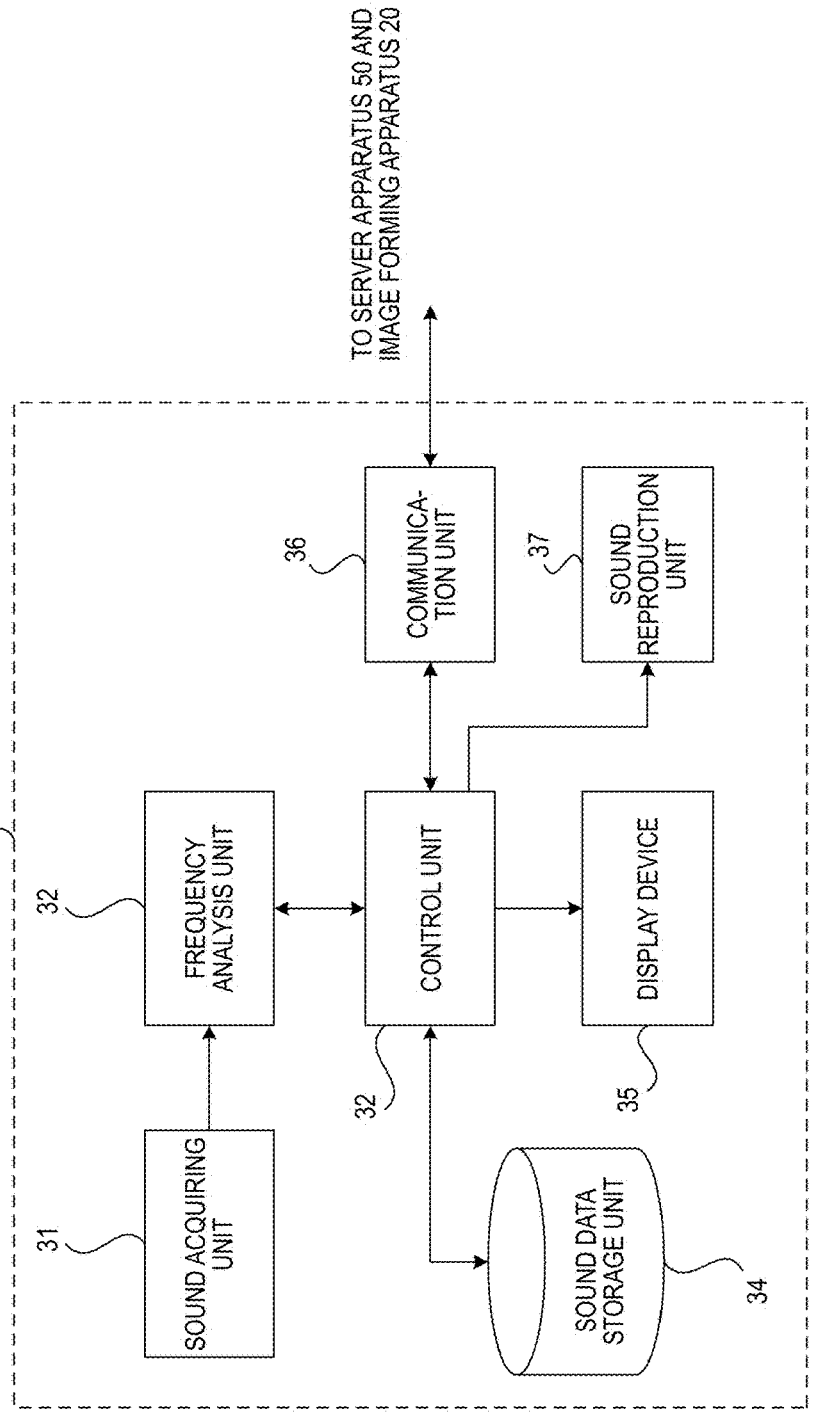
FIG. 3 is a block diagram illustrating a functional configuration of the abnormal sound diagnosis apparatus 10 in the first exemplary embodiment of the invention.

FIG. 3 is a block diagram illustrating a functional configuration of the abnormal sound diagnosis apparatus 10 which is realized by executing the control program.

As illustrated in FIG. 3, the abnormal sound diagnosis apparatus 10 according to this exemplary embodiment includes a sound acquiring unit 31, a frequency analysis unit 32, a control unit 33, a sound data storage unit 34, a display unit 35, a communication unit 36, and a sound reproduction unit 37.

The display unit 35 displays various types of data based on the control of the control unit 33. The communication unit 36 communicates with the server apparatus 50 which is an external device. The sound reproduction unit 37 reproduces recorded sound data and converts the sound data into a sound signal based on the control of the control unit 33.

The sound acquiring unit 31 receives an abnormal sound generated in the image forming apparatus 20 (an analysis target apparatus) to acquire the sound signal.

The description in this exemplary embodiment will be made such that the sound acquiring unit 31 receives the abnormal sound generated in the image forming apparatus 20 to acquire the sound signal, and the sound signal is an example of the sound information.

The frequency analysis unit 32 performs a time frequency analysis (time-dependent frequency analysis) of the sound signal acquired by the sound acquiring unit 31 to generate frequency spectrum waveform (frequency analysis result) data which indicates a temporal variation in distribution of a signal intensity for each frequency of the acquired abnormal sound signal.

Specifically, the frequency analysis unit 32 performs an STFT (short time Fourier transform) on the sound signal acquired by the sound acquiring unit 31 to generate the frequency spectrum waveform data. The STFT will be described below.

The control unit 33 stores the frequency spectrum waveform data acquired by the frequency analysis unit 32 together with the sound data in the sound data storage unit 34. The control unit 33 displays the frequency spectrum waveform acquired as a result of the STFT in the display unit 35 (the touch panel).

Thereafter, the user touches (traces) an area estimated as containing a signal component of the abnormal sound in the frequency spectrum waveform displayed on the display unit 35 (the touch panel) with fingers. The control unit 33 receives a designated area containing the signal component of the abnormal sound in the displayed frequency spectrum waveform based on the user's touch operation.

The control unit 33 instructs the frequency analysis unit 32 to perform a fast Fourier transform (1D-FFT) in which the frequency analysis in a time-axial direction is performed on the frequency component of the area designated as an area containing the signal component of the abnormal sound in the frequency spectrum waveform data acquired by the frequency analysis unit 32. Therefore, the frequency analysis unit 32 performs the fast Fourier transform in the time-axial direction with respect to a frequency component contained in the designated area.

The control unit 33 extracts information on a period and a frequency of the abnormal sound from the analysis result of the fast Fourier transform in the frequency analysis unit 32.

Further, even in a case where the abnormal sound is not generated, the signal component of a normal operation sound is always contained in a low frequency area equal to or less than a predetermined frequency. Therefore, the control unit 33 may be configured not to receive a designation even in a case where the area equal to or less than the predetermined frequency is designated as an area containing the signal component of the abnormal sound.

In addition, the control unit 33 transmits the information of the period and the frequency of the acquired abnormal sound to the server apparatus 50 through the communication unit 36 together with model information such as a model name and a serial number of the image forming apparatus 20, and operating state information indicating an operating state of the image forming apparatus 20. Specifically, the operating state information may include information indicating a color printing or a monochrome printing, a duplex printing or a simplex printing, an operation mode (scan, print, and copy), a type of a using sheet. In this way, the control unit 33 transmits the information obtained from the frequency spectrum waveform data which is obtained by the frequency analysis unit 32 to the server apparatus 50 through the communication unit 36.

In the server apparatus 50, spectrum waveform data obtained through the frequency analysis on the abnormal sound signal generated in the past in a similar type of apparatus as the image forming apparatus 20 is stored together with the original sound data, the operating state of the apparatus when the sound data is acquired, a cause of the abnormal sound, and information of a handling method for the abnormal sound.

The server apparatus 50 retrieves the frequency spectrum waveform (a waveform of a second frequency analysis result) data corresponding to the frequency spectrum waveform data obtained as a result of the frequency analysis by the frequency analysis unit 32 from the information on the period and the frequency of the abnormal sound transmitted from the abnormal sound diagnosis apparatus 10. The server apparatus 50 transmits the frequency spectrum waveform data thus found to the abnormal sound diagnosis apparatus 10 together with the information such as the sound data stored as sample waveform data of the abnormal sound.

As a result, the control unit 33 receives the frequency spectrum waveform data corresponding to the frequency spectrum waveform data obtained as a result of the frequency analysis by the frequency analysis unit 32 from the server apparatus 50 through the communication unit 36.

The control unit 33 controls the display unit 35 to display the frequency spectrum waveform obtained through the frequency analysis of the sound signal acquired by the sound acquiring unit 31, and the spectrum waveform received from the server apparatus 50 in parallel.

In a case where there are plural frequency spectrum waveform data transmitted from the server apparatus 50, the control unit 33 controls the display unit 35 such that data having a high degree of similarity to the frequency spectrum waveform data obtained through the frequency analysis of the frequency analysis unit 32 is displayed by priority among the plurality of frequency spectrum waveform data.

In addition, the control unit 33 acquires operation information indicating an operating component among plural components of the image forming apparatus 20 through the communication unit 36 from the image forming apparatus 20.

The image forming apparatus 20 is configured to be operated in an operation mode in which the operation information is transmitted by a service engineer's specific operation. In a case where the abnormal sound generated in the image forming apparatus 20 is acquired and recorded by a diagnostic apparatus 10, the service engineer operates the image forming apparatus 20 to set the image forming apparatus 20 to the operation mode of transmitting the operation information.

Therefore, the diagnostic apparatus 10 can acquire the sound information of the generated abnormal sound, and also can receive the operation information from the image forming apparatus 20.

An example of apparatus information acquired as described above by the diagnostic apparatus 10 from the image forming apparatus 20 will be described with reference to FIG. 4.

Figure 4:
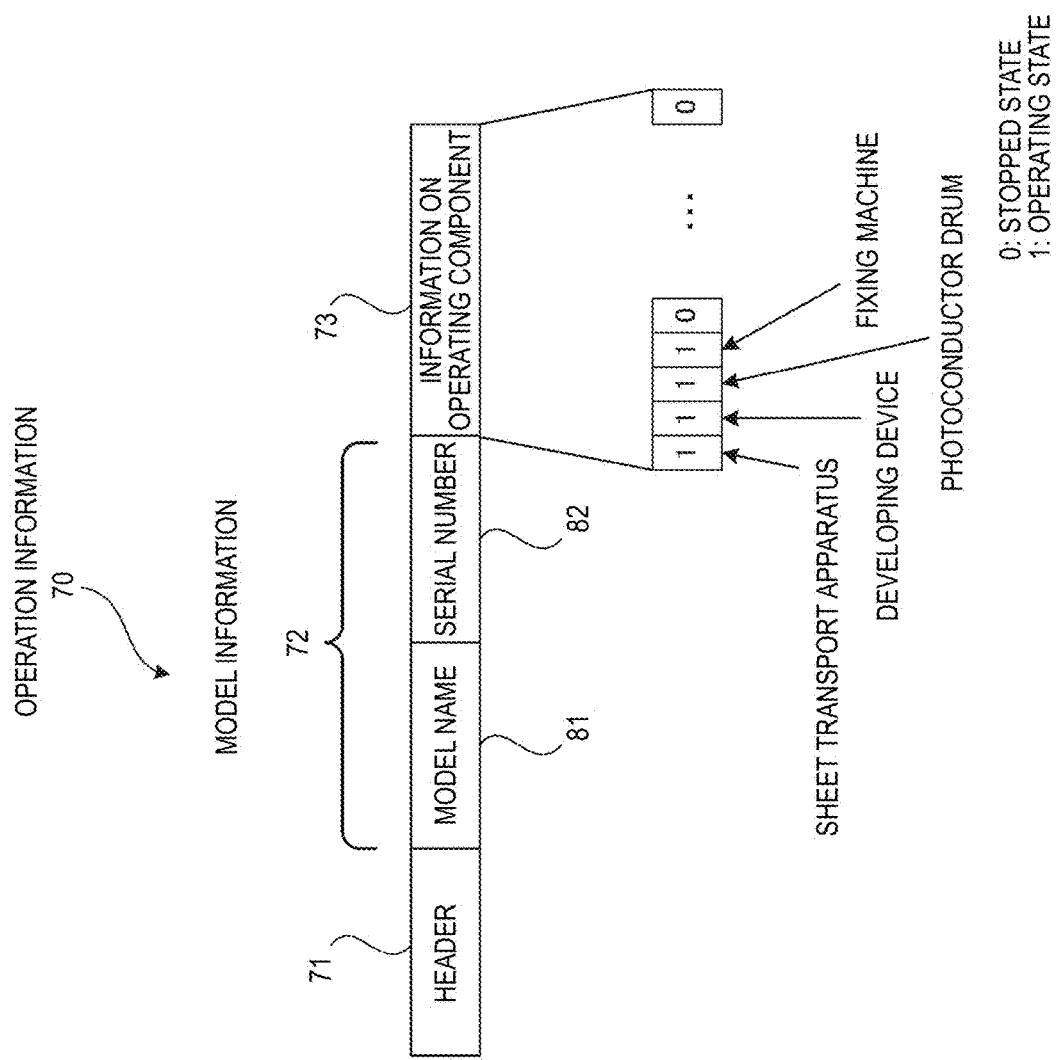
FIG. 4 is a diagram illustrating an example of apparatus information acquired by a diagnostic apparatus 10 from an image forming apparatus 20.

The apparatus information 70 illustrated in FIG. 4 is configured with a header 71, model information 72, and operating component information 73. The model information 72 is configured with a model name 81 and a serial number (model number) 82 of the image forming apparatus 20 which transmits the apparatus information 70.

In addition, the operating component information 73 is information indicating a component which is operating among the plural components of the image forming apparatus 20 (an analysis target apparatus). Specifically, the respective bits of the operating component information 73 correspond to the respective components of the apparatus such as a sheet transport apparatus, a developing device, a photoconductor drum, and a fixing machine. In a case where the bit is set to "1", it shows that the corresponding component is in an operating state. In a case where the bit is set to "0", it shows that the corresponding component is in a stopped state.

The control unit 33 keeps on receiving the operation information as illustrated in FIG. 4 from the image forming apparatus 20 during a period when the sound acquiring unit 31 acquires the abnormal sound of the image forming apparatus 20. Therefore, it is possible to acquire information about that which component starts to operate in synchronization with the acquired sound information, and which component does not yet start to operate.

When the sound information acquired by the sound acquiring unit 31 is reproduced in the sound reproduction unit 37, the control unit 33 controls the display unit 35, using the operation information, to display the operating states of the plural components at the time point when the reproduced sound is acquired.

At this time, the control unit 33 may display the operating states of the plural components together with the image of an intensity profile of sound which indicates a temporal change in intensity of the acquired sound information.

In addition, the control unit 33 may display the operating states of the plural components together with the frequency spectrum waveform data generated by the frequency analysis unit 32.

Furthermore, the control unit 33 may display the operating states of the plural components, using a chart (for instance, a time chart) indicating whether the respective components are operating, at the time point when the reproduced sound is acquired.

Furthermore, the control unit 33 may display the operating states of the plural components at the time point when the reproduced sound is acquired using a schematic diagram of an animation image showing an inner configuration of the image forming apparatus 20.

When the operating states of the components of the image forming apparatus 20 are displayed using the schematic diagram of such an animation image, a state difficult to identify it with eyes such as a starting/stopping of rotation of a rotating body (for instance, a motion showing a change such as a contact state/retract state of a primary transfer roller), and a change affecting on the operation such as turning on/off of a bias voltage even though no physical change occurs can be expressed by changing color or brightness.

In addition, the control unit 33 may display a stop instruction button in the display unit 35 to instruct the sound reproduction unit 37 to stop the reproduction of the sound information in the middle of reproducing the recorded sound. In a case where the stop instruction button is operated during the reproduction of the sound information to instruct the reproduction stop of the sound information, the control unit 33 may display information of a component which causes a change in the operating state at the time point near the time point when the reproduction stop is instructed.

In a case where the animation image as described above is displayed, the control unit 33 may change a display of the information of the component of which the operating state is changed. For instance, the control unit 33 may change or flash the color or the brightness of the component showing the change in the operating state to show the component changed in the operating state to the user.

Next, a functional configuration of the server apparatus 50 in the abnormal diagnosis system according to this exemplary embodiment will be described with reference to a block diagram of FIG. 5.

Figure 5:
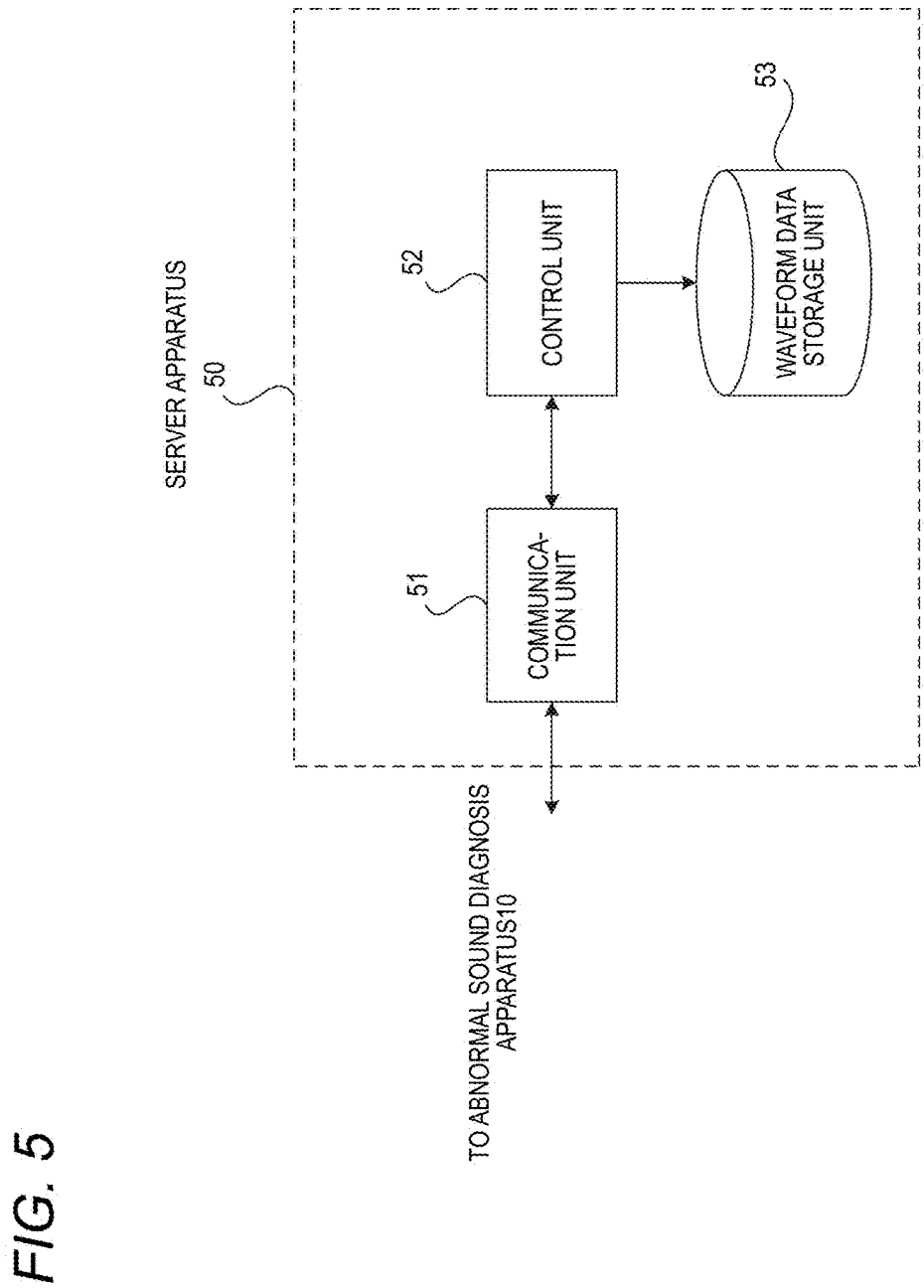
FIG. 5 is a block diagram illustrating a functional configuration of a server apparatus 50 in the first exemplary embodiment of the invention.

The server apparatus 50 of this exemplary embodiment is provided with a communication unit 51, a control unit 52, and a waveform data storing unit 53 as illustrated in FIG. 5.

The waveform data storing unit 53 stores plural pieces of frequency spectrum waveform data obtained through the frequency analysis on the abnormal sound signal generated in the past in a similar type of apparatus as the image forming apparatus 20 (the analysis target apparatus).

Specifically, the waveform data storing unit 53 stores the frequency spectrum waveform data obtained through the time frequency analysis on the abnormal sound data acquired in advance, the original sound data, a cause of the abnormal sound, and information of the handling method as illustrated in FIG. 6 for each type of apparatus.

In a case where the information of the period and the frequency of the abnormal sound is received from the abnormal sound diagnosis apparatus 10, the control unit 52 selects waveform data similar to the waveform data of the frequency spectrum based on the abnormal sound acquired in the abnormal sound diagnosis apparatus 10 from among the waveform data of the plural frequency spectrums stored in the waveform data storing unit 53 based on the received information of the period and the frequency of the abnormal sound. The control unit 52 transmits the selected waveform data to the abnormal sound diagnosis apparatus 10 through the communication unit 51.

Figure 7:
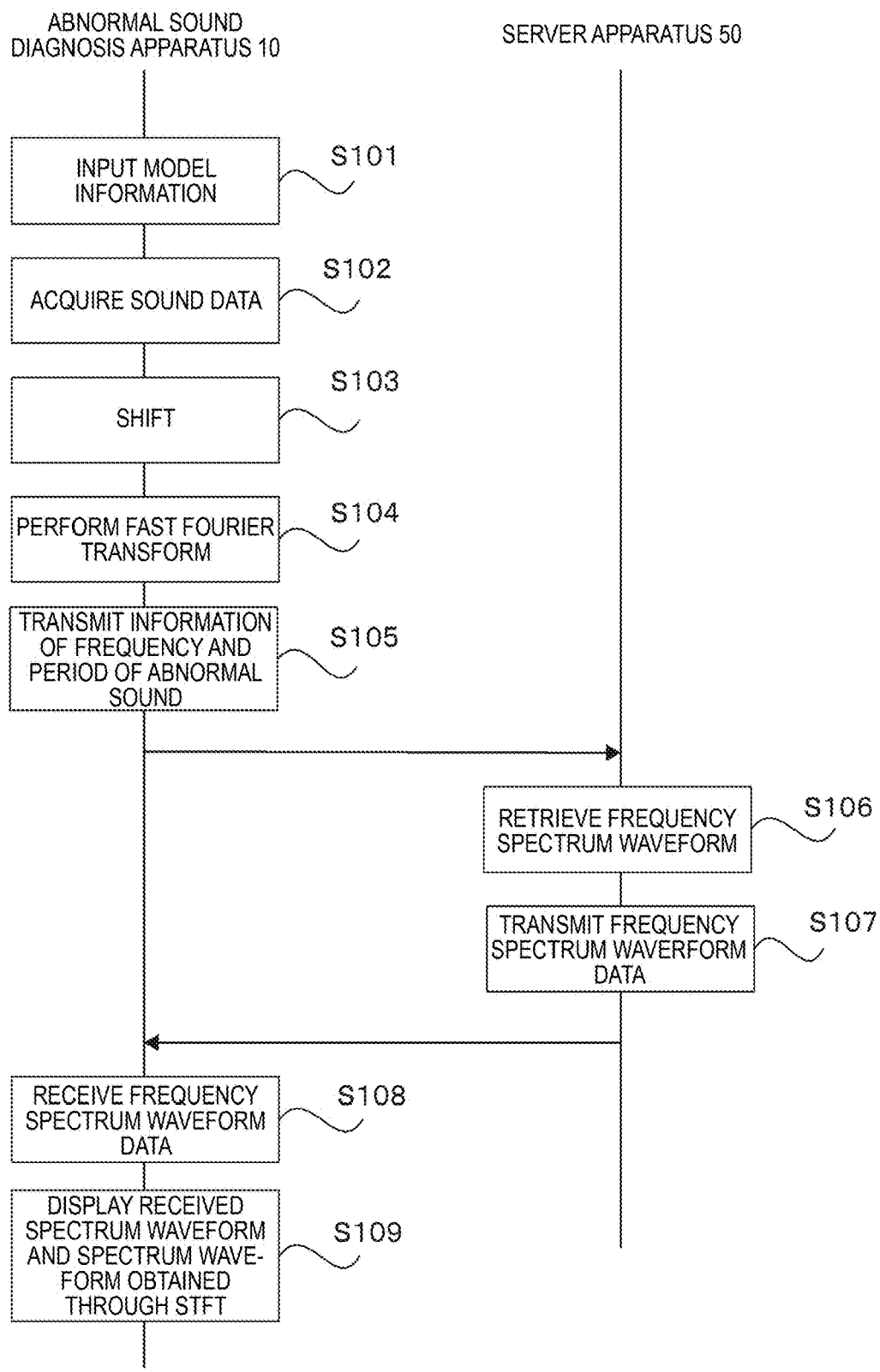
FIG. 7 is a sequence chart illustrating an operation of the abnormal sound diagnosis system of the first exemplary embodiment of the invention.

Next, the operation of the abnormal sound diagnosis system of this exemplary embodiment will be described with reference to a sequence chart of FIG. 7.

In a case where the abnormal sound diagnosis apparatus 10 performs an abnormal diagnosis to specify a cause of the abnormal sound, various types of information such as the model name, the serial number, and the operating state are input (Step S101).

The abnormal sound diagnosis apparatus 10 sets the operation mode to a sound recording mode to record the abnormal sound while bringing the microphone 17 near to a place where the abnormal sound is generated in the image forming apparatus 20, and thus acquires the sound data (Step S102).

In the abnormal sound diagnosis apparatus 10, the frequency analysis unit 32 performs the STFT on the acquired sound data to generate the frequency spectrum waveform indicating the temporal variation in distribution of the signal intensity for each frequency (Step S103).

Figure 8:
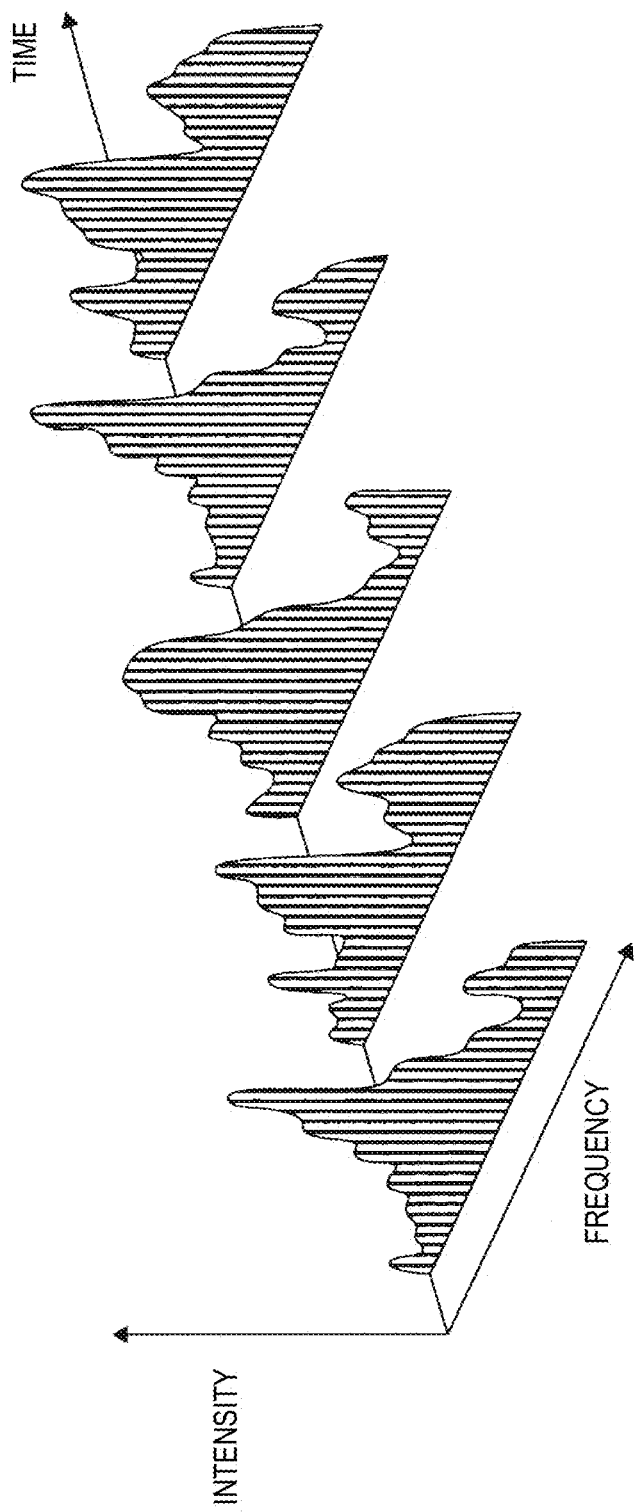
FIG. 8 is a diagram illustrating a concept of an STFT.
Figure 9:
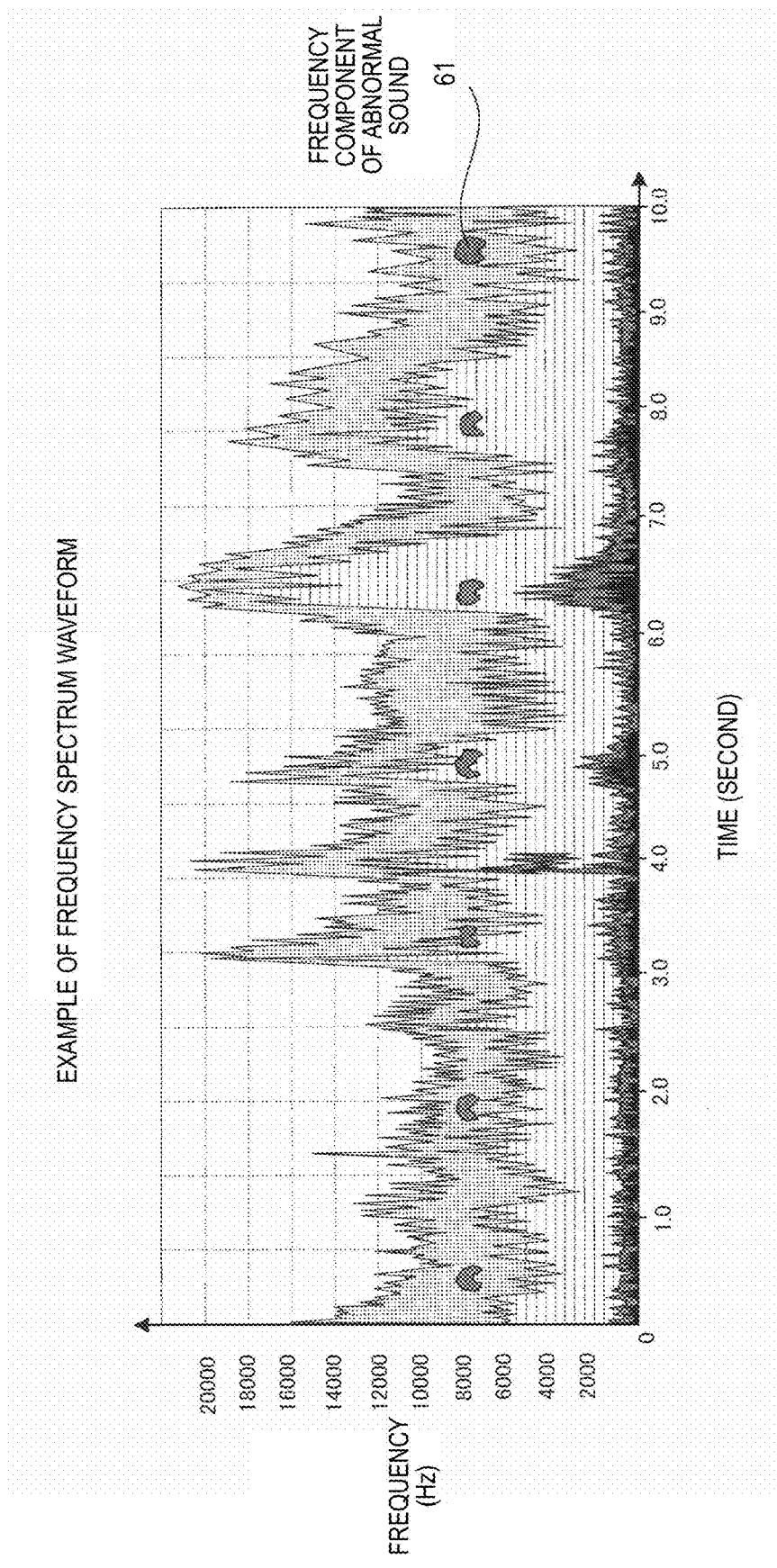
FIG. 9 is a diagram illustrating an exemplary image of a frequency spectrum waveform based on an analysis result obtained by the STFT.

In the STFT, the Fourier transform is performed for each short time as illustrated in FIG. 8 to calculate the signal intensity according to the temporal variation for each frequency component. FIG. 9 illustrates an example of a waveform in a case where an image of each frequency spectrum waveform is obtained as an analysis result of the STFT.

In the example of the frequency spectrum waveform illustrated in FIG. 9, the horizontal axis represents time, and the vertical axis represents frequency. The intensity for each frequency is expressed with color. In FIG. 9, a difference in color is expressed using hatching. In addition, FIG. 9 illustrates an example in a case where the intensity for each frequency is expressed with color, and the intensity may be expressed with gradation.

In the example of the frequency spectrum waveform of FIG. 9, it can be seen that a frequency component 61 of the abnormal sound is periodically generated at a specific frequency. In the example of the frequency spectrum waveform illustrated in FIG. 9, a low frequency component is a normal operation sound but not the frequency component of the abnormal sound.

Figure 10:
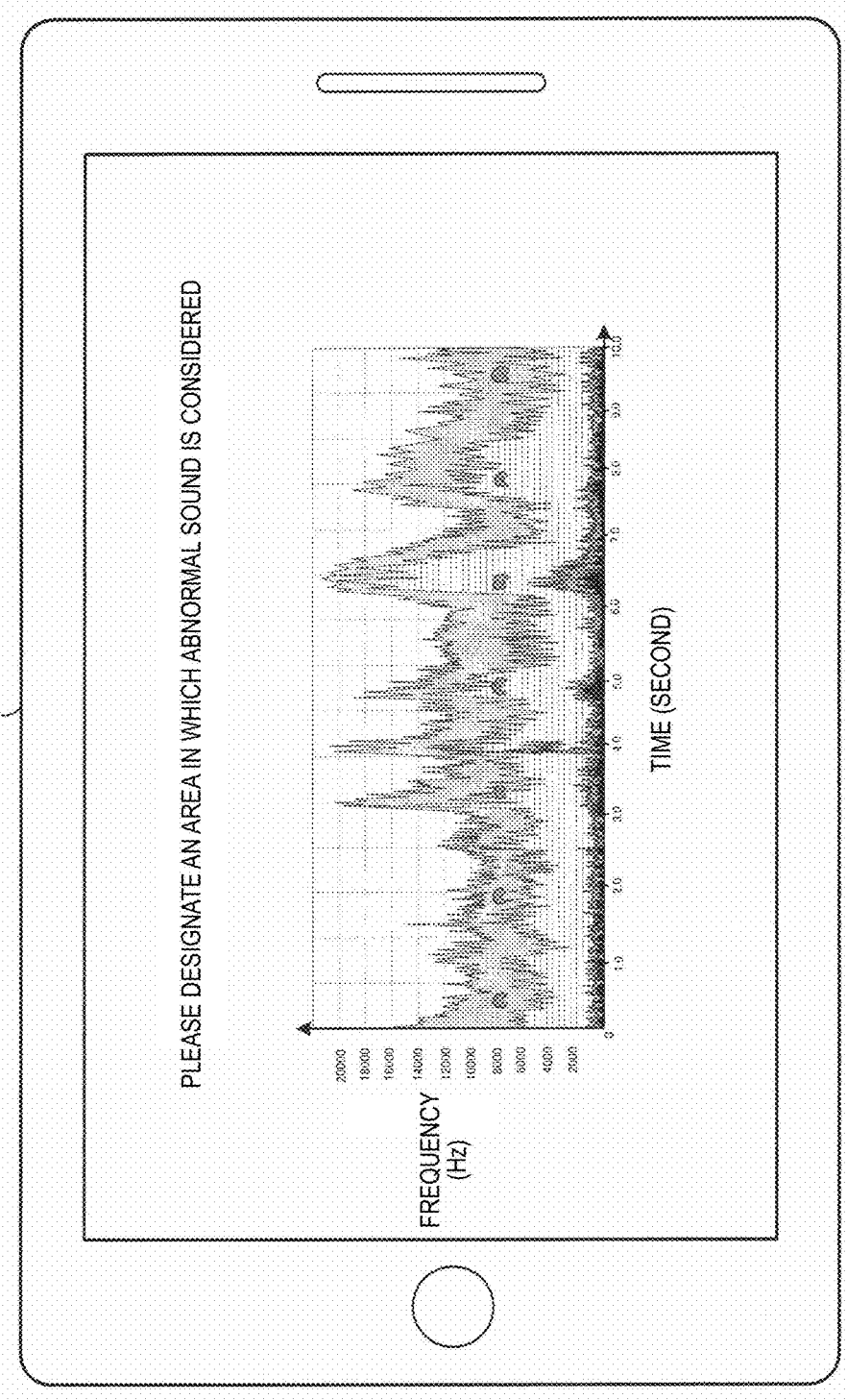
FIG. 10 is a diagram illustrating an example of a display in a case where a user is prompted to designate an area estimated as containing an abnormal sound when the frequency spectrum waveform is presented to the user.

When the frequency spectrum waveform as illustrated in FIG. 9 is obtained, the control unit 33 controls the display unit 35 to display the frequency spectrum waveform. The control unit 33 makes displaying to prompt the user to designate an area estimated as containing the abnormal sound in the displayed frequency spectrum waveform as illustrated in FIG. 10. In the example illustrated in FIG. 10, it can be seen that a character string "Please designate an area in which an abnormal sound is considered." is displayed to prompt the user to designate the area estimated as containing the abnormal sound.

When viewing such a display, the user who is represented with the frequency spectrum waveform specifies the frequency component 61 of the abnormal sound. For instance, the user selects an area where the frequency component 61 of the abnormal sound by operating the touch panel.

Figure 11:
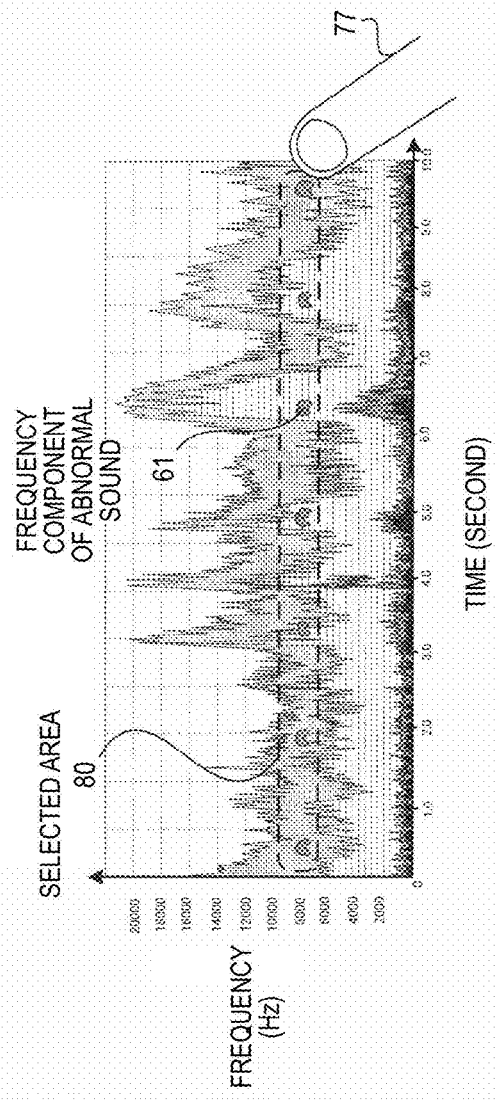
FIG. 11 is a diagram illustrating an example of a selected area 80 which is selected by the user in an exemplary image of the frequency spectrum waveform of FIG. 10.

An example of a selected area 80 selected by the user as described above is illustrated in FIG. 11. In the example illustrated in FIG. 11, it can be seen that the user operates the touch panel with a finger 77 to designate a rectangular area containing the frequency component 61 of plural abnormal sounds as the selected area 80.

When the selected area 80 is designated as described above, the fast Fourier transform (1D-FFT) is performed on the frequency component contained in the selected area 80 by the frequency analysis unit 32 (Step S104). An exemplary analysis result of the fast Fourier transform performed as described above is illustrated in FIG. 12.

Figure 12:
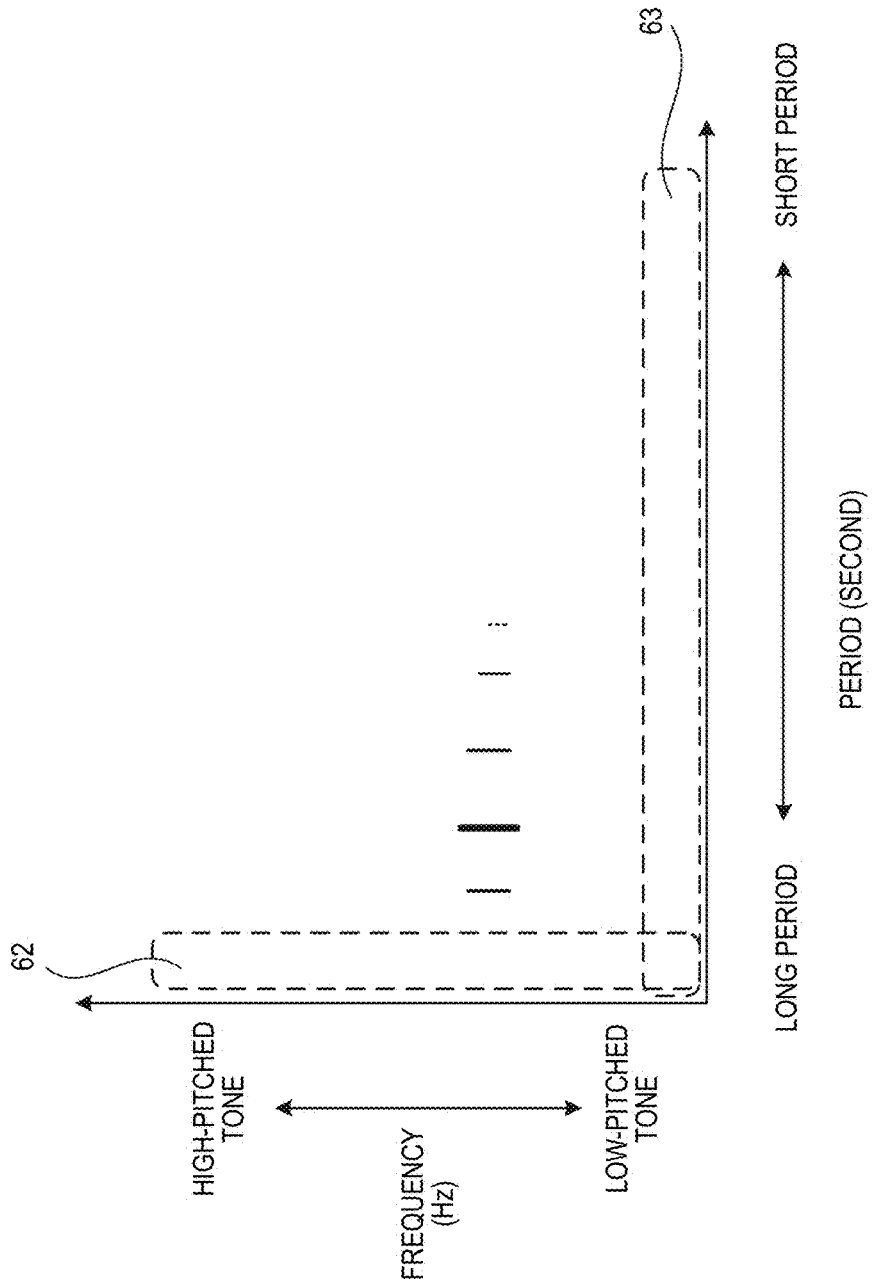
FIG. 12 is a diagram illustrating an exemplary analysis result of a fast Fourier transform.

In FIG. 12, the period and the frequency of the abnormal sound are specified by detecting the period and the frequency of the signal of the frequency component on which the fast Fourier transform is performed. Since the abnormal sound contains harmonic components, there may be detected plural periods. However, a period of the strongest signal intensity is detected as the period of the abnormal sound.

In addition, a signal component having a long period equal to or more than a predetermined period is considered as of a normal operation sound or of a noise having no fixed period. Therefore, the area of such a long period signal component is set to an out-of-determination area 62, and the analysis result in the out-of-determination area 62 is ignored.

Furthermore, a signal component having a low frequency equal to or less than a predetermined frequency is also not distinguished from the normal operation sound. Therefore, the area of such a low frequency signal component is set to an out-of-determination area 63, and the analysis result in the out-of-determination area 63 is ignored.

The abnormal sound diagnosis apparatus 10 transmits the information of the period and the frequency of the abnormal sound obtained as an analysis result of the fast Fourier transform to the server apparatus 50 together with the model information and the information of the operating state (Step S105). For instance, the information such as a frequency of 4 kHz (the frequency of the abnormal sound) and a period of 2.0 seconds (the period of the abnormal sound) is transmitted to the server apparatus 50.

The server apparatus 50 retrieves the waveform data storing unit 53 based on the received information to extract the data of the frequency spectrum waveform corresponding to the received information (Step S106).

The server apparatus 50 transmits the extracted frequency spectrum waveform data to the abnormal sound diagnosis apparatus 10 together with the information such as the original sound data, the cause of the abnormal sound, and the handling method (Step S107).

The abnormal sound diagnosis apparatus 10 receives the frequency spectrum waveform data which is transmitted from the server apparatus 50 (Step S108). The control unit 33 of the abnormal sound diagnosis apparatus 10 controls the display unit 35 to display the received frequency spectrum waveform and the frequency spectrum waveform obtained through the STFT (Step S109).

Figure 13:
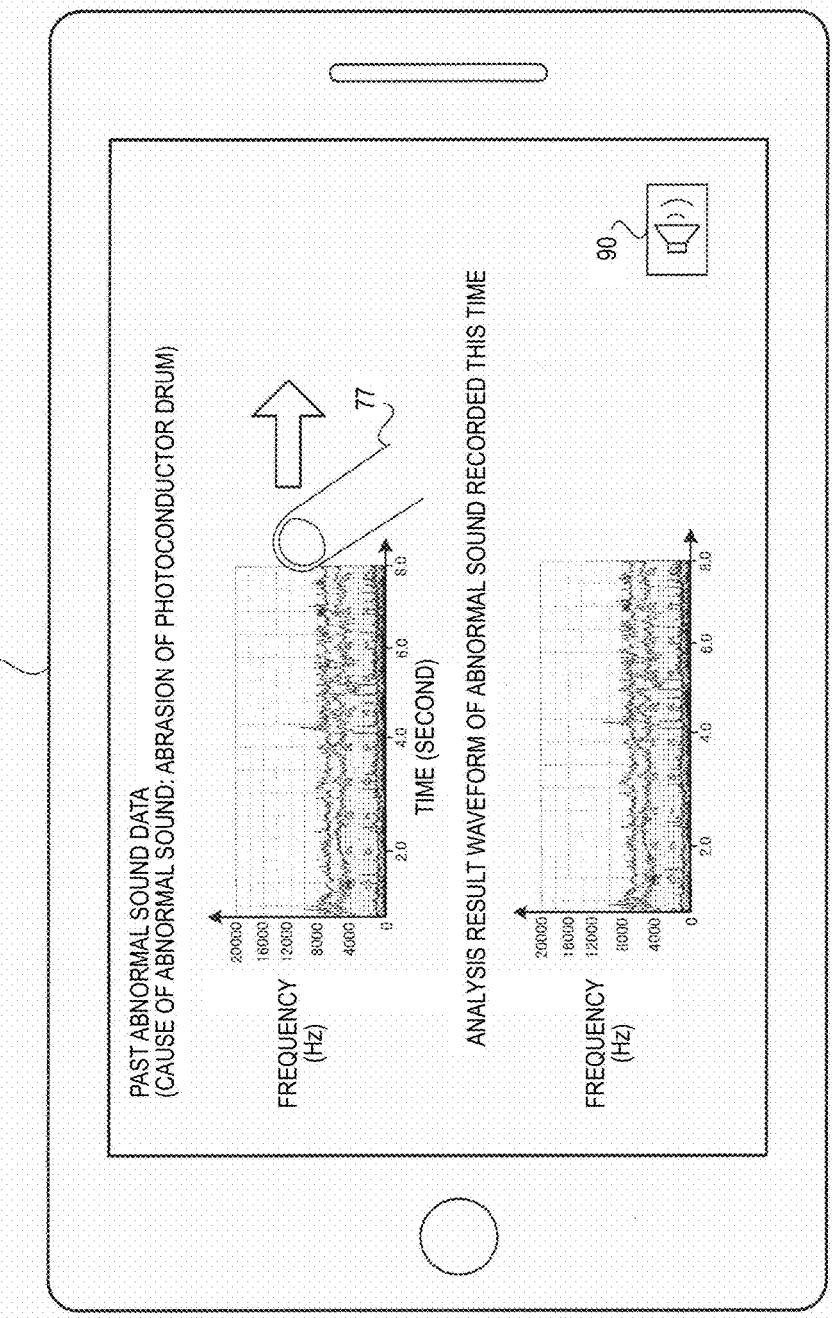
FIG. 13 is a diagram illustrating an exemplary screen of the abnormal sound diagnosis apparatus 10 in which two frequency spectrum waveforms are displayed.

FIG. 13 illustrates an exemplary screen of the abnormal sound diagnosis apparatus 10 in which the two frequency spectrum waveforms are displayed.

In the exemplary screen illustrated in FIG. 13, it can be seen that the frequency spectrum waveform obtained through the STFT in the frequency analysis unit 32 is displayed as "Analysis resultant waveform of recorded abnormal sound this time", and the frequency spectrum waveform transmitted from the server apparatus 50 is displayed as "Abnormal sound data in the past" together with "Abrasion of the photoconductor drum" as a cause of the abnormal sound.

The service engineer analyzing the abnormal sound compares these two frequency spectrum waveforms to determine whether the abnormal sound components in the waveforms are similar, and specifies a cause of the abnormal sound.

Figure 14:
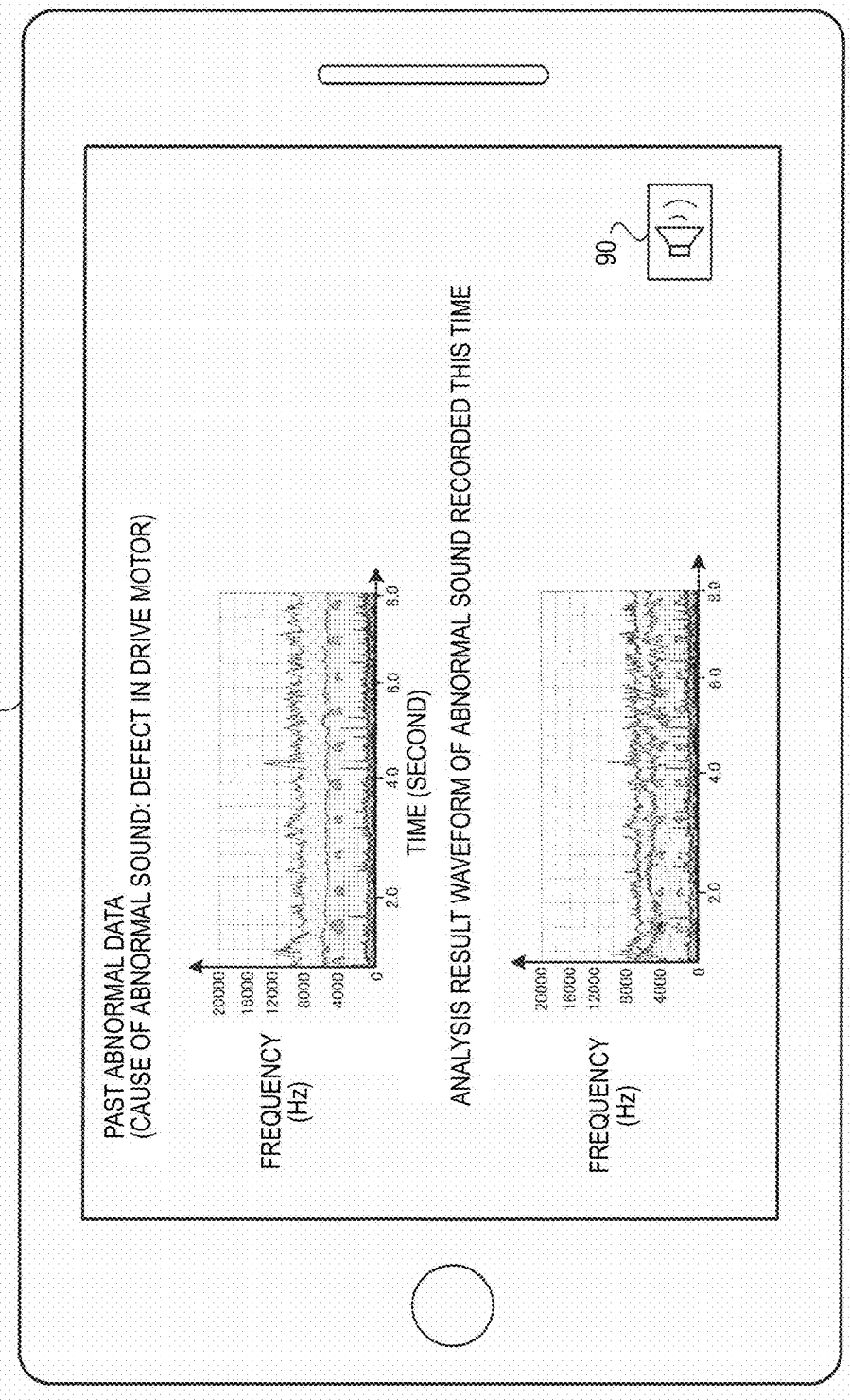
FIG. 14 is a diagram illustrating an exemplary image in a case where there are displayed frequency spectrum waveforms having a different cause of the abnormal sound with respect to the exemplary screen illustrated in FIG. 13.

In addition, in a case where plural frequency spectrum waveforms are transmitted from the server apparatus 50, for instance, another frequency spectrum waveform is displayed as illustrated in FIG. 14 by laterally tracing the image of the frequency spectrum waveform displayed as "Abnormal sound data in the past" through the touch operation with the finger 77.

FIG. 14 illustrates an exemplary image in a case where the frequency spectrum waveform of the abnormal sound when a cause of the abnormal sound is "Defect in a drive motor".

As described above, in a case where the plural frequency spectrum waveforms are transmitted, the service engineer determines whether the frequency spectrum waveform of the abnormal sound acquired this time is similar to any frequency spectrum waveform, and specifies a cause of the abnormal sound. In specifying a cause of the abnormal sound, a cause of the abnormal sound is specified not only by comparing the shapes of the frequency spectrum waveforms, and the periods and the frequencies of the abnormal sound components, but also reproducing the original sound data using the sound reproduction unit 37 for acoustically comparing the abnormal sound acquired this time with the sound corresponding to the frequency spectrum waveform transmitted from the server apparatus 50.

In addition, in FIGS. 13 and 14 described above, a reproduce button 90 is displayed to reproduce the sound information indicated by the displayed frequency spectrum waveform. When the reproduce button 90 is operated in a state where the displayed frequency spectrum waveform is selected, the sound information of the selected frequency spectrum waveform is reproduced by the sound reproduction unit 37.

Figure 15:
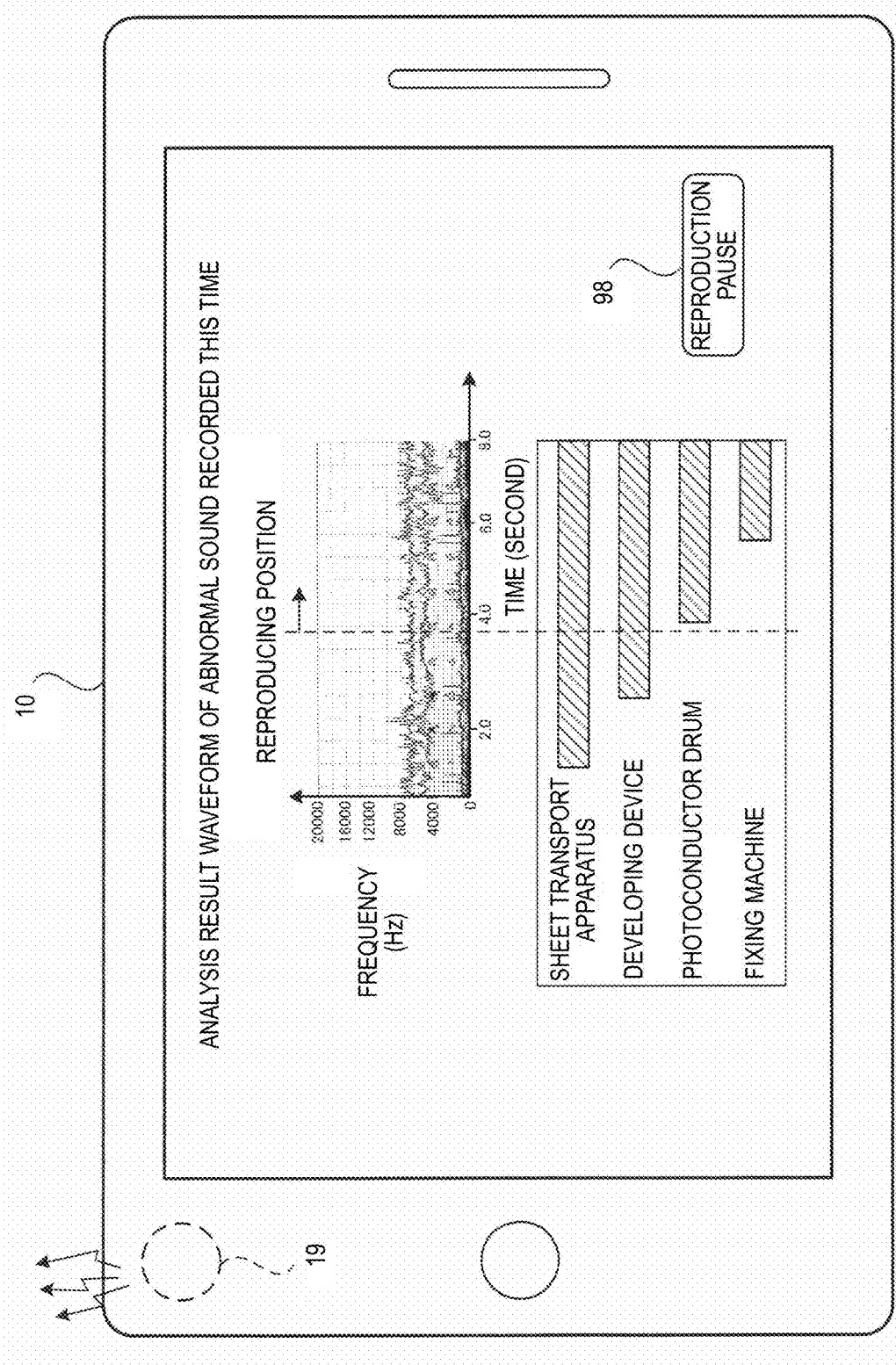
FIG. 15 is a diagram illustrating an exemplary display screen in a case where the frequency spectrum waveform of acquired sound information is displayed together with operating states of the respective components in a time chart.

FIG. 15 illustrates an exemplary display screen in a case where the sound information is reproduced. In FIG. 15, there is displayed a time chart indicating whether the operating states of the plural components are in operation at the time point when the reproduced sound is acquired together with the frequency spectrum waveform of the currently reproduced sound. In addition, it can be seen from FIG. 15 that the reproduced sound is output from a speaker 19, the reproducing position corresponding to the sound is indicated by a dotted line on the frequency spectrum waveform and the time chart, and the reproducing position sequentially moves along with the reproduction of the sound.

The service engineer who tries to specify a cause of the abnormal sound can ascertain a component which starts to operate at the start point when the abnormal sound is generated with reference to the screen display as illustrated in FIG. 15 while reproducing the abnormal sound.

In addition, a reproduction pause button 98 is displayed in the display screen illustrated in FIG. 15. The reproduction of the sound information is stopped by operating the reproduction pause button 98 at the start time when the abnormal sound is generated, so that a component causing the abnormal sound can be easily specified.

Figure 16:
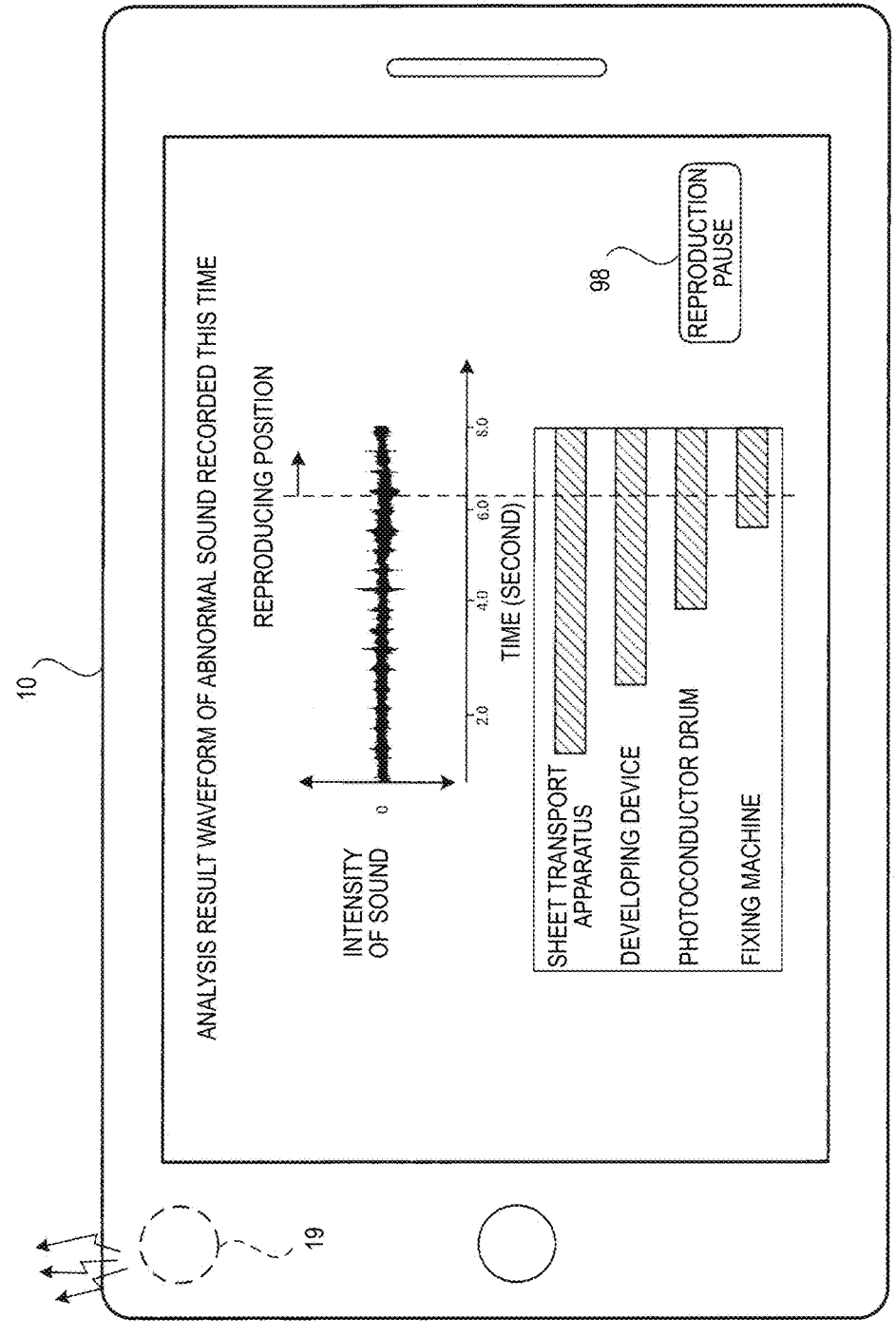
FIG. 16 is a diagram illustrating an exemplary display screen in a case where an intensity profile of sound is displayed.

In addition, FIG. 16 illustrates an exemplary display screen in a case where the intensity profile of sound is displayed in place of the frequency spectrum waveform. Even in the exemplary display screen illustrated in FIG. 16, it can be seen that the dotted line indicating the reproducing position of the reproduced sound is depicted on the image of the intensity profile of sound and the time chart of the operating components.

Figure 17:
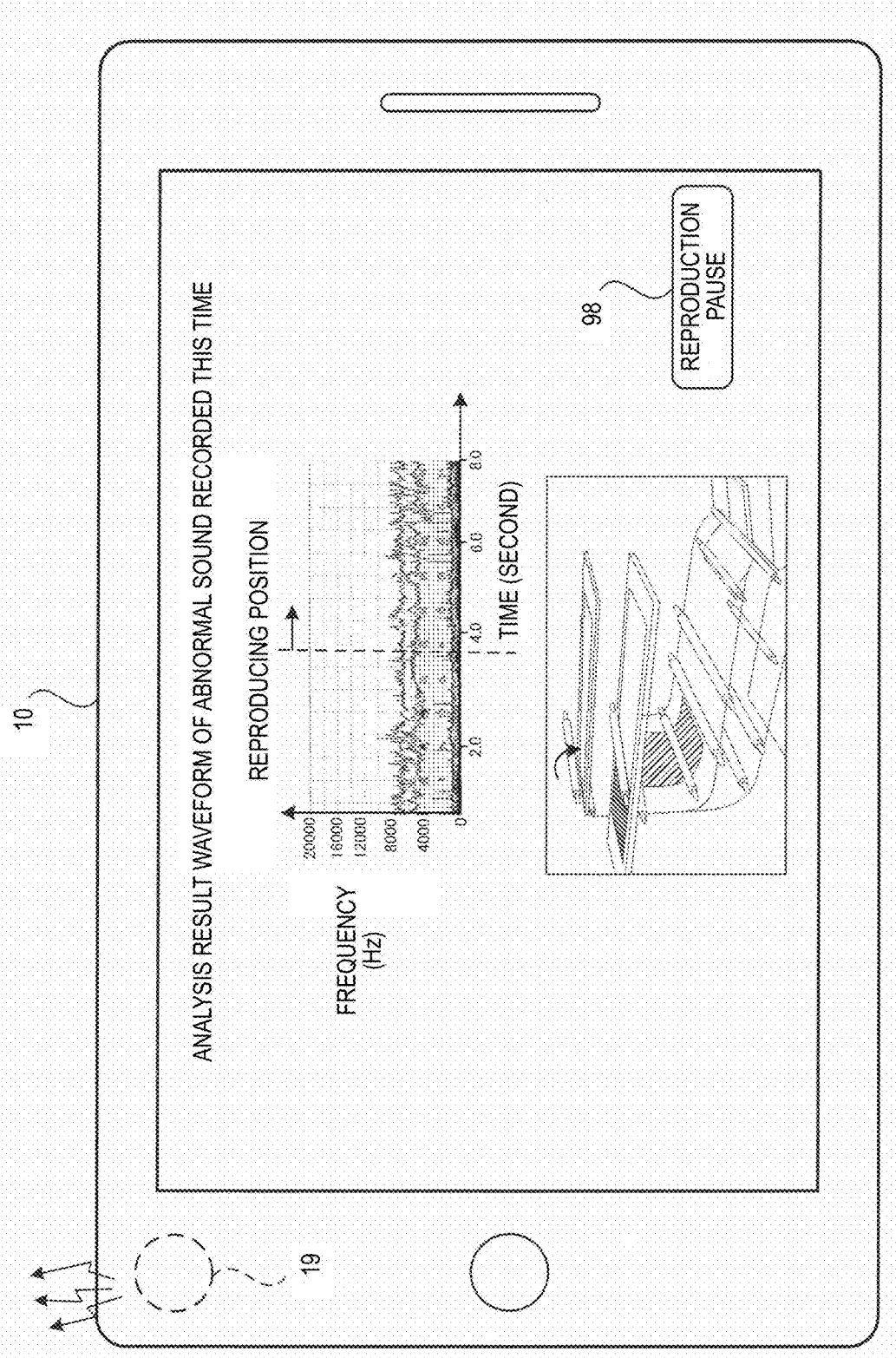
FIG. 17 is a diagram illustrating an exemplary display screen in a case where the operation state of a component is displayed by an animation image.

Furthermore, FIG. 17 illustrates an exemplary display screen in a case where the operating state of the component is displayed by the animation image in place of the time chart of the operating components. In FIG. 17, it can be seen that a component display in the animation image also operates when the component starts to operate, and it can be visually confirmed whether there is a component starting its operation at the start time point when the abnormal sound is generated while hearing the reproduced sound.

Figure 18:
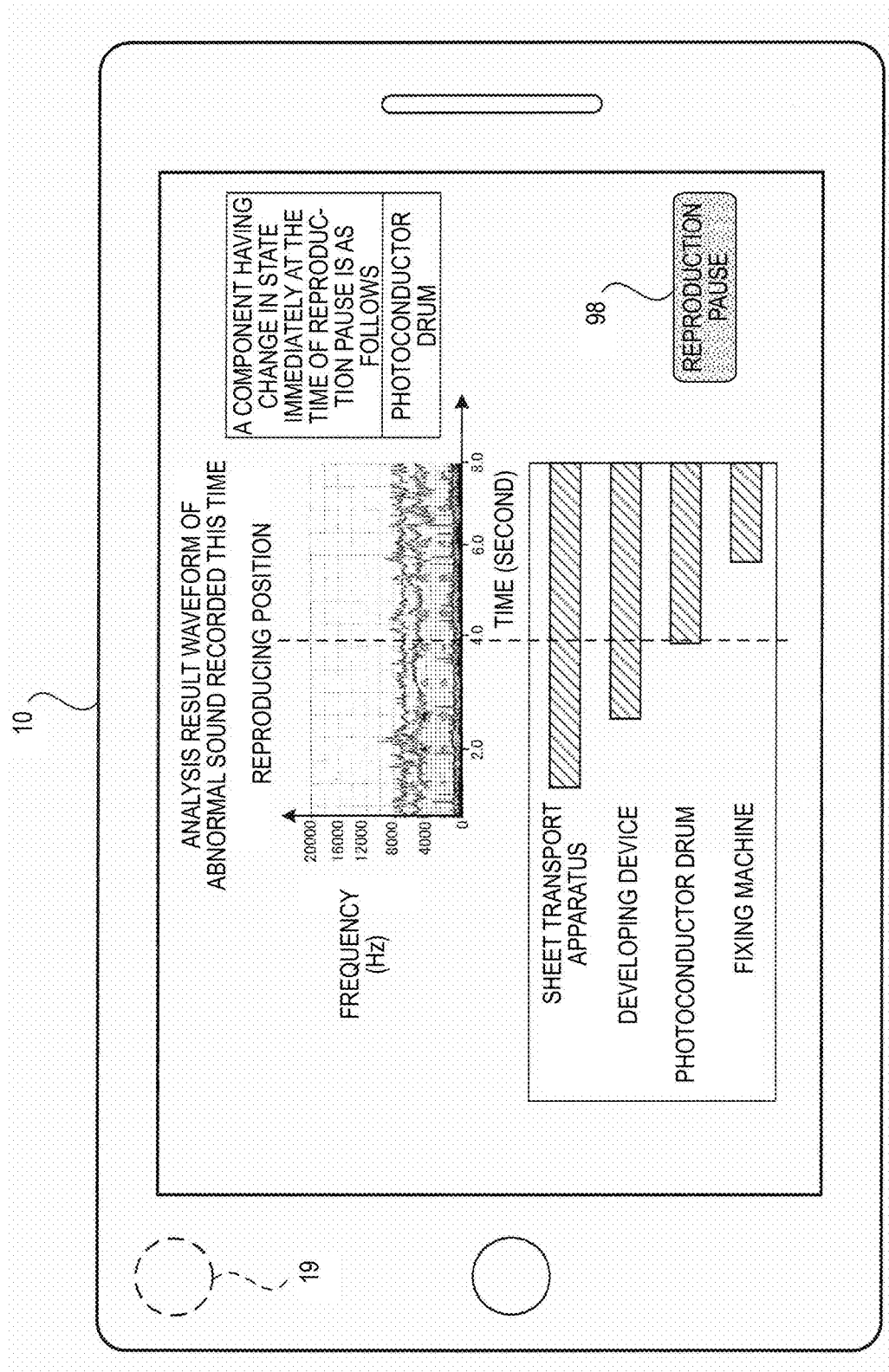
FIG. 18 is a diagram illustrating an exemplary screen in a case where a service engineer operates a reproduction pause button 98 in the exemplary display screen illustrated in FIG. 15 when an abnormal sound is generated.

In addition, FIG. 18 illustrates an exemplary screen in a case where the service engineer operates the reproduction pause button 98 in the exemplary display screen illustrated in FIG. 15 at the start time point when the abnormal sound is generated.

In FIG. 18, the reproduction of the abnormal sound is stopped when the reproduction pause button 98 is operated, and the movement of the dotted line indicating the reproducing position is also stopped. In FIG. 18, it can be seen that a list of components changed in their states around the time point when the reproduction is stopped is displayed on the screen. In FIG. 18, since the movement of the photoconductor drum is started around the time point when the reproduction pause button 98 is operated, "Photoconductor drum" is displayed as a component of which the state is changed around the time point when the reproduction is stopped.

Since the display is performed as described above, the service engineer estimates that the cause of the abnormal sound is the photoconductor drum.

The description in this exemplary embodiment has been made about that the abnormal sound diagnosis apparatus 10 receives operation information 70 from the image forming apparatus 20 through the wireless line such as Wi-Fi. However, the invention is able to be realized even when the operation information 70 is received through other communication lines such as an infrared communication and an audio communication. In addition, the abnormal sound diagnosis apparatus 10 may receive the operation information 70 from the image forming apparatus 20 through a wired line by connecting the abnormal sound diagnosis apparatus 10 to the image forming apparatus 20 using a cable.

Second Exemplary Embodiment

Next, an abnormal sound diagnosis system of a second exemplary embodiment of the invention will be described.

In the abnormal sound diagnosis system of the first exemplary embodiment described above, the abnormal sound diagnosis apparatus 10 has received the operation information from the image forming apparatus 20 to ascertain the operating state of the component of the image forming apparatus 20.

The abnormal sound diagnosis system of this exemplary embodiment is provided with an image forming apparatus 20a in place of the image forming apparatus 20, and the other configurations are the same as those of the first exemplary embodiment.

The image forming apparatus 20a in this exemplary embodiment is provided with an output unit which outputs the sound signal as an operation timing sound indicating a timing of operation start of each of the plural components of the own device.

Figure 19:
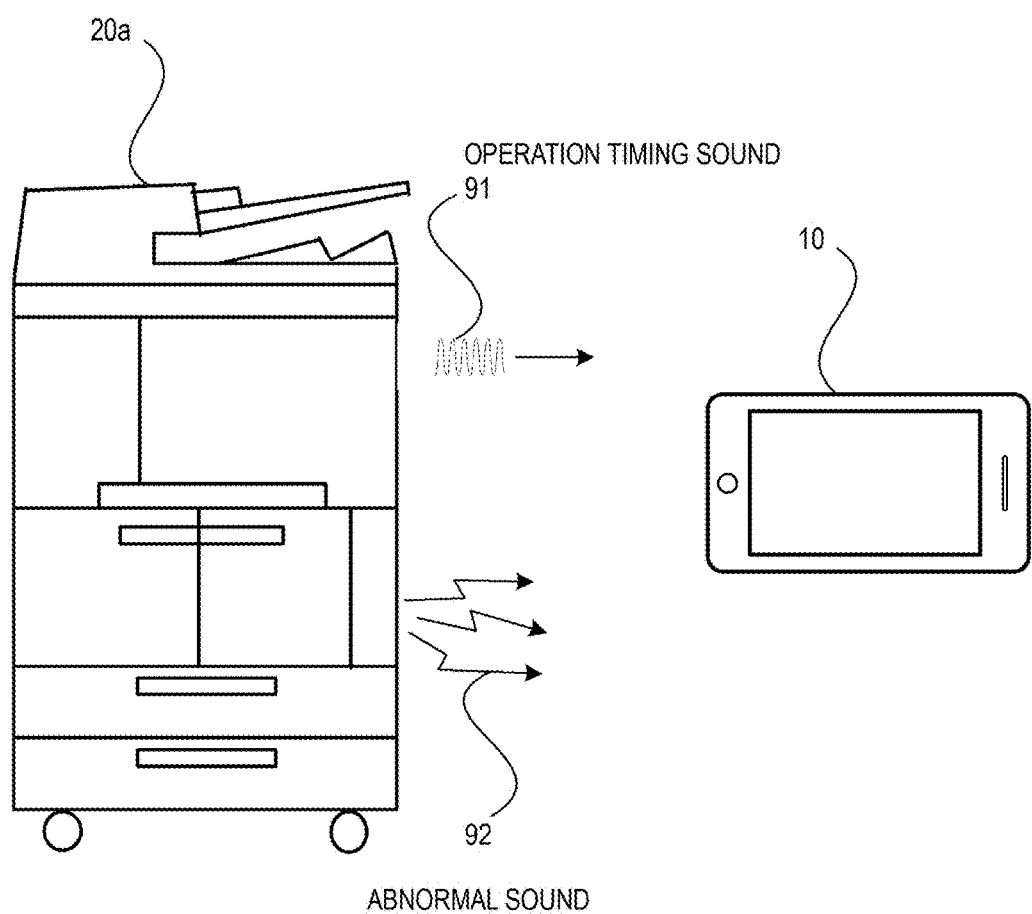
FIG. 19 is a diagram illustrating a situation where an image forming apparatus 20a of a second exemplary embodiment of the invention outputs an operation timing sound 91.

The image forming apparatus 20a in this exemplary embodiment outputs a timing of operation start of the component of the own device as an operation timing sound 91 using a sound signal such as a beep sound as illustrated in FIG. 19. The operation timing sound 91 is set to be different in at least one of a tone, a volume, the number of phonation, and a frequency pattern for each component which starts its operation. Therefore, it is possible to identify a component which starts the operation.

In the abnormal sound diagnosis system of this exemplary embodiment, when acquiring an abnormal sound 92 of the image forming apparatus 20a without receiving the operation information, the abnormal sound diagnosis apparatus 10 acquires the operation timing sound 91 output from the image forming apparatus 20a at the same time.

Figure 20:
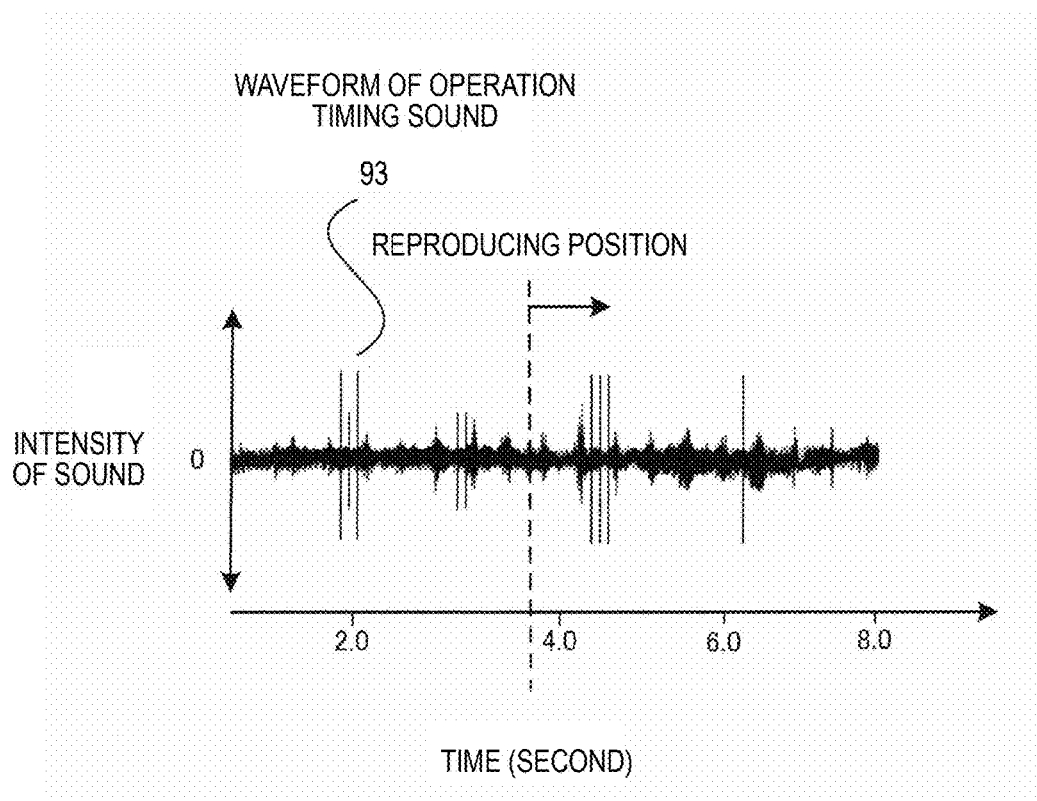
FIG. 20 is a diagram illustrating an example of an intensity profile of sound containing a waveform 93 of an operation timing sound.

FIGS. 20 and 21 illustrate an example in a case where the volume of the operation timing sound 91 is set to two patterns of small and large volumes. A component starting its operation can be identified by a sound pattern obtained by combining the volume patterns and the number of phonation.

FIG. 20 illustrates a situation where a waveform 93 of the operation timing sound is contained in the image of the intensity profile of sound. The sound pattern of the operation timing sound is differently set for each component which starts the operation as illustrated in FIG. 21. Therefore, a timing when the component starts its operation can be confirmed only by looking at the intensity profile of sound.

For instance, the sound pattern of the operation timing sound output at the time point when a transfer belt starts the operation is set to "Two times at small volume". Therefore, when the operation timing sound of such a sound pattern is recorded, it can be known that the transfer belt starts the operation at that time point.

According to this exemplary embodiment, a component which starts the operation around the time point when the abnormal sound of the displayed intensity profile of sound starts to be generated is specified. Therefore, it is possible to estimate a cause of the abnormal sound.

In addition, the description will be made about an example where a component starting its operation is identified by the frequency pattern of the operation timing sound when the frequency spectrum waveform of the acquired sound is displayed with reference to FIGS. 22 and 23.

Figure 22:
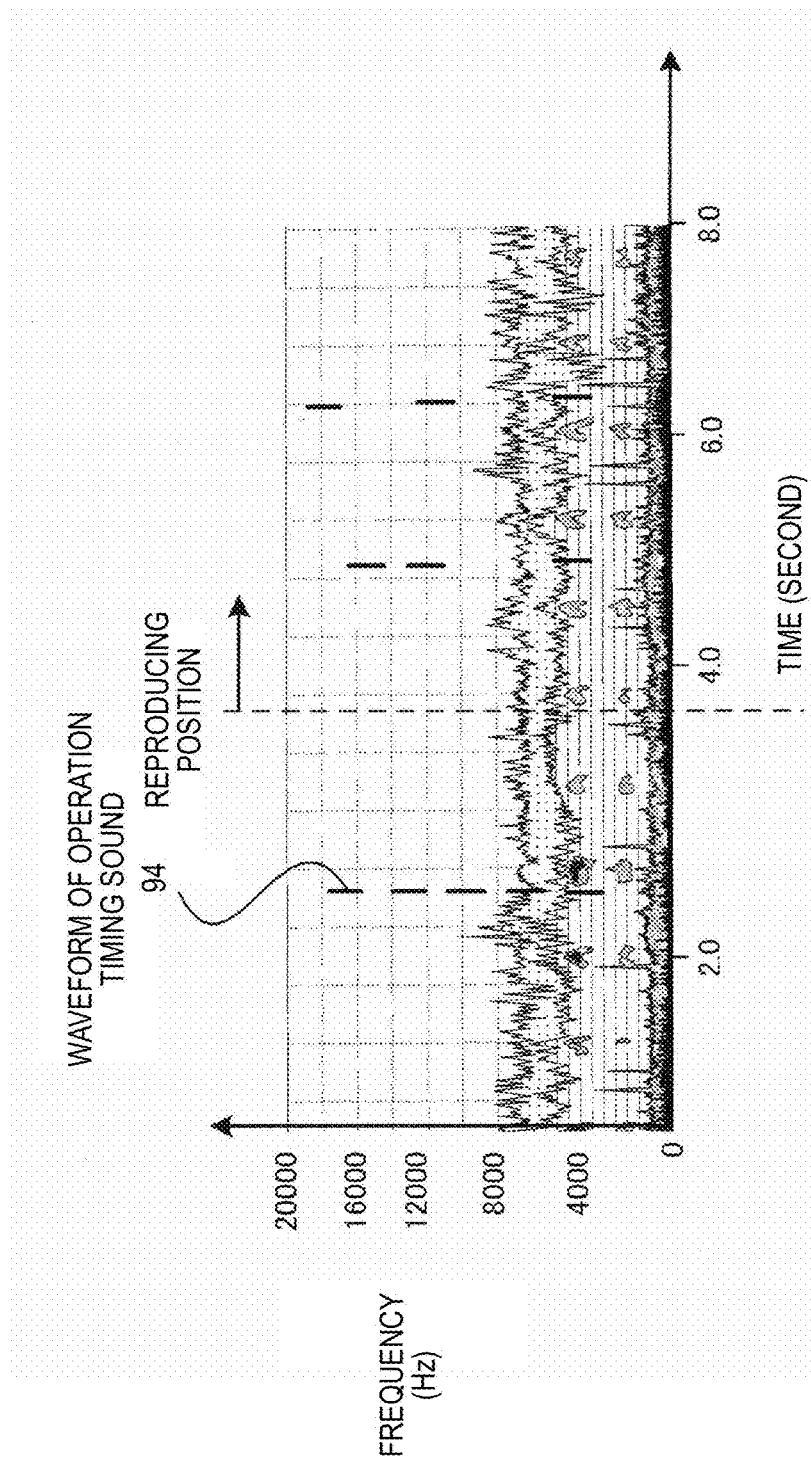
FIG. 22 is a diagram illustrating an example of the frequency spectrum waveform containing a waveform 94 of the operation timing sound.

FIG. 22 illustrates a situation where a waveform 94 of the operation timing sound is contained in the image of the frequency spectrum waveform. The frequency pattern of the operation timing sound is differently set for each component which starts the operation as illustrated in FIG. 23. Therefore, a timing when the component starts its operation can be confirmed only by looking at the frequency spectrum waveform of the sound.

For instance, the frequency pattern of the operation timing sound output at the time point when the transfer belt starts the operation is set to "4 kHz, 6 kHz, 8 kHz, and 10 kHz". Therefore, when the operation timing sound of such a frequency pattern is recorded, it can be known that the transfer belt starts the operation at that time point.

According to this exemplary embodiment, a component which starts the operation around the time point when the abnormal sound of the displayed intensity profile of sound starts to be generated is specified. Therefore, it is possible to estimate a cause of the abnormal sound.

Modifications

In the above exemplary embodiment, the description has been made about a case where the abnormal sound diagnosis apparatus 10 is the tablet terminal apparatus, but the invention is not limited thereto. Even in a case where other apparatus is used as the abnormal sound diagnosis apparatus, the invention can be applied thereto. For instance, an operation panel of the image forming apparatus 20 may be configured to be detachably attached to the main body, communicate with the server apparatus 50, and have a function of acquiring the sound signal. In this case, the operation panel may be used as the abnormal sound diagnosis apparatus.

In addition, in the above exemplary embodiment, the description has been made using a case where the microphone 17 is embedded in the abnormal sound diagnosis apparatus 10. However, an acquiring unit of the sound signal may be realized by connecting a sound collecting device such as the microphone to the outside as long as the sound recording function is provided in the abnormal sound diagnosis apparatus 10.

In addition, in the above exemplary embodiment, the description has been made using a case where the area estimated as containing the abnormal sound is designated by the user through the touch operation, but the invention is not limited thereto. The invention may be similarly applied even to a case where the area estimated as containing the abnormal sound is designated by other methods such as a case where the area is designated by a pen input, a case where a frequency estimated as the abnormal sound is directly input by numbers, and a case where the area is designated by a mouse operation.

In the above exemplary embodiment, the description has been made using a case where the image forming apparatus is a target apparatus of the abnormal sound analysis, but the target apparatus of the abnormal sound analysis is not limited to the image forming apparatus. The invention may be similarly applied even to other apparatus as long as the apparatus can generate the abnormal sound having a periodicity.

In the above exemplary embodiment, the abnormal sound generated in the image forming apparatus 20 may be acquired using the abnormal sound diagnosis apparatus 10 such as a tablet terminal and specify a cause of the generation.

However, the invention is not limited to the above configuration, and may be configured such that the function of the abnormal sound diagnosis apparatus 10 described above is incorporated in the main body of the image forming apparatus 20.

In this case, the image forming apparatus 20 acquires the sound information and also acquires the operation information indicating the operating component among the plural components of the own device. When reproducing the acquired sound information, the image forming apparatus 20 uses the acquired operation information to display the operating states of the plural components at the time point when the reproduced sound is acquired.

Furthermore, the operating states of the plural components may be displayed when the image forming apparatus 20 is operated without recording the sound information in the image forming apparatus 20.

Figure 24:
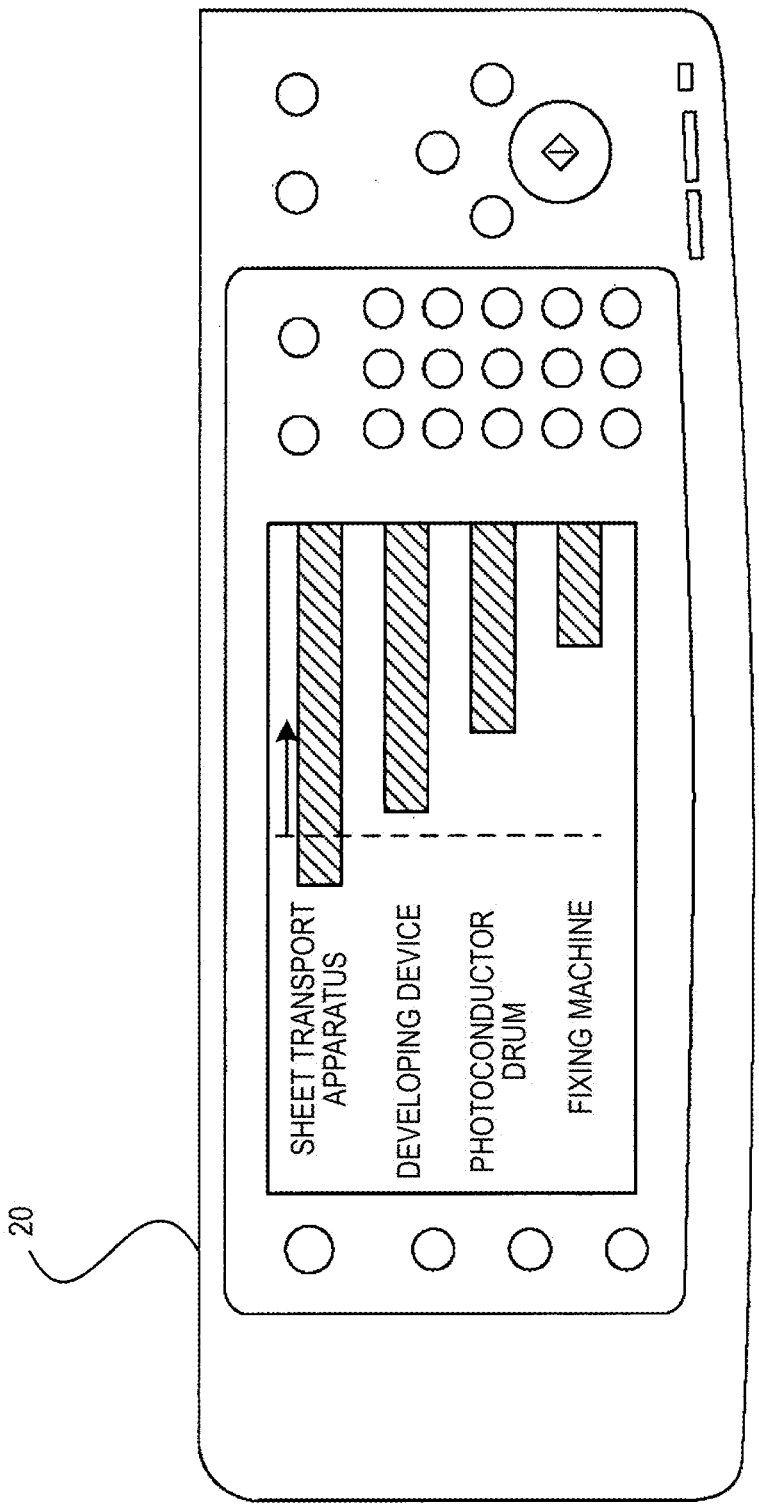
FIG. 24 is a display example in a case where the operating states of the plural components at the current time point are displayed on an operation panel of the image forming apparatus 20 using a graph such as a time chart which shows whether the respective components are in operation.
Figure 25:
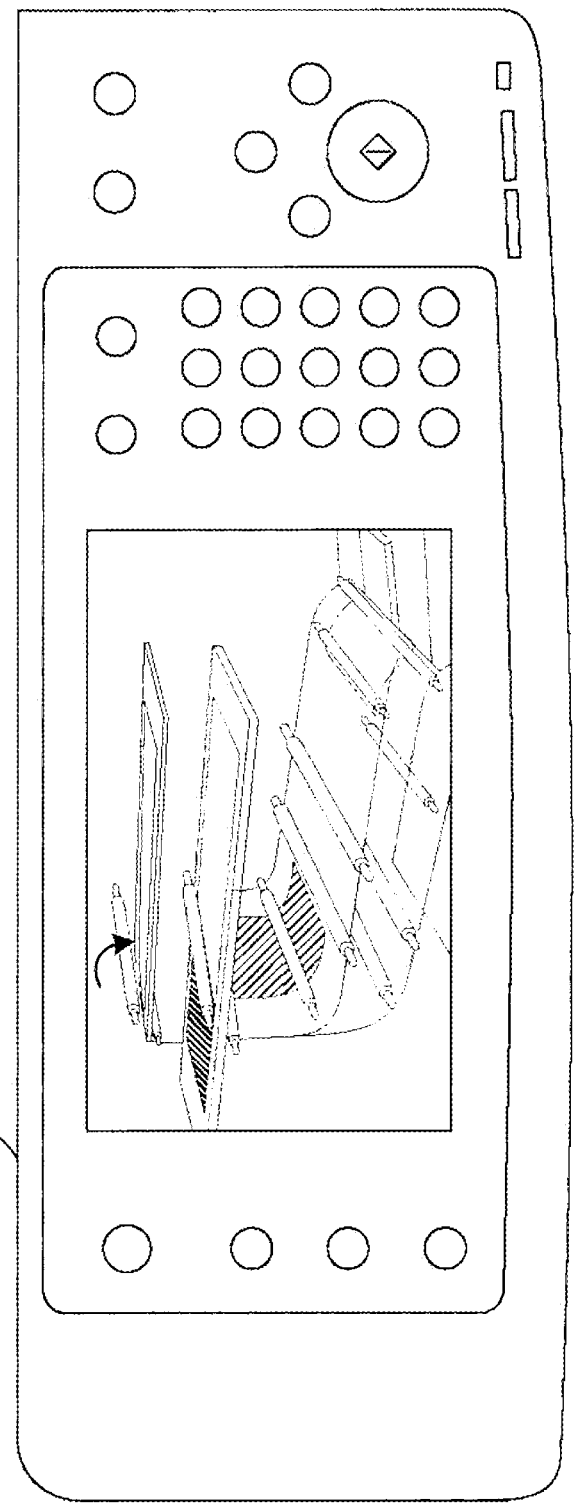
FIG. 25 is a display example in a case where the operating states of the plural components are displayed using a schematic diagram such as an animation image showing an inner configuration of the image forming apparatus 20.

FIGS. 24 and 25 illustrate an example in a case where the operating states of the respective components in the image forming apparatus 20 are displayed on the operation panel of the image forming apparatus 20.

FIG. 24 is a display example in a case where the operating states of the plural components at the current time point are displayed on the operation panel of the image forming apparatus 20 using a graph such as a time chart showing whether the respective components are in operation.

In addition, FIG. 25 is a display example in a case where the operating states of the plural components are displayed using a schematic diagram such as an animation image showing an inner configuration of the image forming apparatus 20.

Even in the cases of FIGS. 24 and 25, it is possible to estimate a cause of the generation of the abnormal sound by confirming a start timing of the abnormal sound while referring such a display.

What is claimed is:

1. A diagnostic apparatus, comprising:
a memory storing instructions;
a touch panel; and
at least one processor configured to execute the stored instructions to:
acquire a sound signal of an analysis target apparatus and recorded by a microphone;
perform a time frequency analysis of the sound signal to generate frequency analysis result data;
control the touch panel to display the frequency analysis result data and to receive a designation of an area containing a signal component of abnormal sound in the displayed frequency analysis result data based on a user's touch operation;
perform a frequency analysis on a frequency component of the designated area;
extract information on a period and a frequency of the abnormal sound from a result of the frequency analysis;
retrieve a frequency spectrum waveform of the abnormal sound corresponding to the period and the frequency of the abnormal sound;
acquire, via wireless communication with the analysis target apparatus, operation information indicating a component in operation among a plurality of components of the analysis target apparatus and operating states of the plurality of components when the sound signal is recorded by the microphone;
control to reproduce the acquired sound signal; and
control the touch panel to display the retrieved frequency spectrum waveform and, when the acquired sound signal is reproduced, synchronously display the operating states of the plurality of components at respective time points when the reproduced sound signal is recorded, using the operation information,
wherein the analysis target apparatus is an image forming apparatus.

2. The diagnostic apparatus according to claim 1, wherein the at least one processor is configured to execute the stored instructions further to control the touch panel to synchronously display the operating states of the plurality of components together with an image indicating a temporal change in intensity of the acquired sound signal.

3. The diagnostic apparatus according to claim 1, wherein the at least one processor is configured to execute the stored instructions further to:
perform a time frequency analysis on the sound signal to generate the frequency analysis result data indicating a temporal variation in distribution of intensity for each frequency; and
control the touch panel to synchronously display the operating states of the plurality of components together with the frequency analysis result data.

4. The diagnostic apparatus according to claim 1, wherein the at least one processor is configured to execute the stored instructions further to control the touch panel to synchronously display the operating states of the plurality of components at the respective time points when the reproduced sound signal is acquired, using a chart indicating whether the respective components are operating.

5. The diagnostic apparatus according to claim 1, wherein the at least one processor is configured to execute the stored instructions further to control the touch panel to synchronously display the operating states of the plurality of components at the respective time points when the reproduced sound signal is acquired, using a schematic diagram of the analysis target apparatus.

6. The diagnostic apparatus according to claim 1, wherein the at least one processor is configured to execute the stored instructions further to, in response to receiving an instruction to stop the reproduction of the sound signal, control the touch panel to display information of a component of which the operating state is changed most recently relative to a time point when the stopping of the reproduction is instructed.

7. The diagnostic apparatus according to claim 1, wherein the at least one processor is configured to execute the stored instructions further to:
   perform the time frequency analysis on the sound information to generate the frequency analysis result data indicating a temporal variation in distribution of intensity for each frequency;
   perform a fast frequency analysis on the frequency component of the designated area;
   extract the information on the period and the frequency of the frequency component from an analysis result of the fast frequency analysis;
   control to transmit the extracted information on the period and the frequency to an external device; and
   receive, from the external device, the frequency spectrum waveform corresponding to the analysis result of the fast frequency analysis.

8. The diagnostic apparatus according to claim 7, wherein the at least one processor is configured to execute the stored instructions further to control to transmit, with the extracted information on the period and the frequency, at least one of the acquired operation information and model information of the analysis target apparatus.

9. A non-transitory computer readable medium storing a program causing a computer to execute a process for diagnosing, the process comprising:
   acquiring a sound signal of an analysis target apparatus and recorded by a microphone;
   performing a time frequency analysis of the sound signal to generate frequency analysis result data;
   controlling to display, via a touch panel, the frequency analysis result data and receiving a designation of an area containing a signal component of abnormal sound in the displayed frequency analysis result data based on a user's touch operation;
   performing a frequency analysis on a frequency component of the designated area;
   extracting information on a period and frequency of the abnormal sound from a result of the frequency analysis;
   retrieving a frequency spectrum waveform of the abnormal sound corresponding to the period and the frequency of the abnormal sound;
   controlling to acquire, via wireless communication with the analysis target apparatus, operation information indicating a component in operation among a plurality of components of the analysis target apparatus and operating states of the plurality of components when the sound information is recorded by the microphone;
   controlling to reproduce the acquired sound information; and
   controlling to display the retrieved frequency spectrum waveform and, when the acquired sound information is reproduced, controlling to synchronously display the operating states of the plurality of components at respective time points when the reproduced sound signal is recorded, using the operation information,
   wherein the analysis target apparatus is an image forming apparatus.

10. A diagnostic method, comprising:
   acquiring a sound signal of an analysis target apparatus and recorded by a microphone;
   performing a time frequency analysis of the sound signal to generate frequency analysis result data;
   displaying, via a touch panel, the frequency analysis result data and receiving a designation of an area containing a signal component of abnormal sound in the displayed frequency analysis result data based on a user's touch operation;
   performing a frequency analysis on a frequency component of the designated area;
   extracting information on a period and frequency of the abnormal sound from a result of the frequency analysis;
   retrieving a frequency spectrum waveform of the abnormal sound corresponding to the period and the frequency of the abnormal sound;
   acquiring, via wireless communication with the analysis target apparatus, operation information indicating a component in operation among a plurality of components of the analysis target apparatus and operating states of the plurality of components when the sound information is recorded by the microphone;
   controlling to reproduce the acquired sound signal; and
   displaying the retrieved frequency spectrum waveform and, when the acquired sound information is reproduced, synchronously displaying the operating states of the plurality of components at respective time points when the reproduced sound information is recorded, using the operation information,
   wherein the analysis target apparatus is an image forming apparatus.

* * * * *